United States Patent
Shibuya et al.

[11] Patent Number: 5,821,319
[45] Date of Patent: Oct. 13, 1998

[54] LIQUID CRYSTAL POLYAMIDE-IMIDE COPOLYMER

[75] Inventors: Atsushi Shibuya; Yuichi Okawa, both of Kanagawa-ken; Shoji Tamai, Fukuoka-ken; Masahiro Ohta; Akihiro Yamaguchi, both of Kanagawa-ken, all of Japan

[73] Assignee: Mitsui Chemicals, Inc., Tokyo, Japan

[21] Appl. No.: 627,037

[22] Filed: Apr. 3, 1996

[30] Foreign Application Priority Data

| Apr. 13, 1995 | [JP] | Japan | 7-087974 |
| Jul. 10, 1995 | [JP] | Japan | 7-173338 |
| Aug. 2, 1995 | [JP] | Japan | 7-197375 |
| Oct. 4, 1995 | [JP] | Japan | 7-257363 |

[51] Int. Cl.$^6$ .............. C08G 73/10; C08G 69/26
[52] U.S. Cl. .............. 528/170; 528/172; 528/173; 528/174; 528/176; 528/183; 528/185; 528/188; 528/220; 528/229; 528/350; 528/322; 528/310; 528/353; 428/1; 428/357; 428/364; 428/395; 428/411.1; 428/473.5; 524/425; 524/514; 524/600; 524/606
[58] Field of Search .................. 528/170, 310, 528/322, 172, 173, 174, 176, 183, 185, 188, 220, 229, 350, 352, 353; 428/1, 357, 364, 395, 411.1, 473.5; 524/425, 514, 600, 606

[56] References Cited

U.S. PATENT DOCUMENTS

| 5,162,454 | 11/1992 | Pfaender | 525/432 |
| 5,196,506 | 3/1993 | Tamai et al. | 528/353 |
| 5,212,279 | 5/1993 | Nomura et al. | 528/353 |
| 5,258,441 | 11/1993 | Nagahiro et al. | 524/425 |
| 5,321,096 | 6/1994 | Okawa et al. | 525/422 |

FOREIGN PATENT DOCUMENTS

| 0324315 | 12/1988 | European Pat. Off. |
| 0430430 | 10/1990 | European Pat. Off. |
| 0564299 | 4/1993 | European Pat. Off. |

OTHER PUBLICATIONS

Asanuma et al, "Synthesis of Thermotropic Liquid Crystal Polyimide and its Properties", *Journal of Polymer Science, Polymer Chemistry Edition*, vol. 32, pp. 2111–2118, 1994.
Patent Abstracts of Japan, vol. 15, No. 436, Nov. 1991 & JP–A–03 185023 *Abstract*.
Patent Abstracts of Japan, vol. 11, No. 38, Feb. 1987 & JP–A–61203171 *Abstract*.
Patent Abstracts of Japan, vol. 8, No. 71, Apr. 1984 & JP–A–58222112 *Abstract*.

*Primary Examiner*—P. Hampton-Hightower
*Attorney, Agent, or Firm*—Burns, Doane, Swecker & Mathis, L.L.P.

[57] ABSTRACT

A sliding material and a heat resistant filament which primarily comprises a liquid crystal polyimide, a liquid crystal polyamide or a liquid crystal polyamide-imide copolymer having at least one recurring structural unit selected from the formula (1) and the formula (2) and is excellent in heat resistance, mechanical characteristics and other fundamental properties of polyimides, and relates to significant improvement of heat-resistance by heat-treating the sliding material, the filament and the molded items. The liquid crystal polyamide-imide copolymer which comprises in a polymer molecule 0.05~0.95 mole ratio of the recurring structural units of the formula (1) and 0.95~0.05 mole ratio of recurring structural units of the formula (2) has excellent processing ability

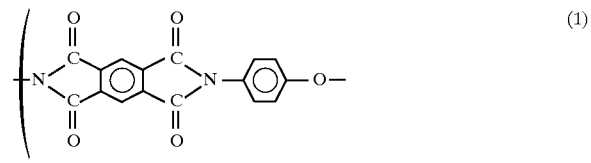

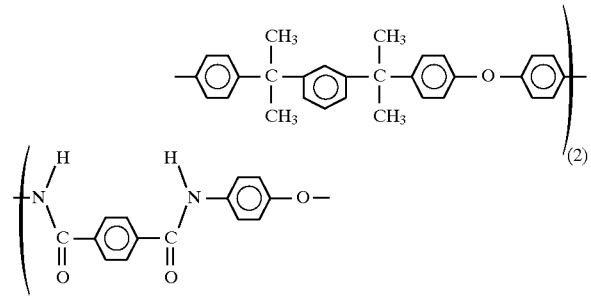

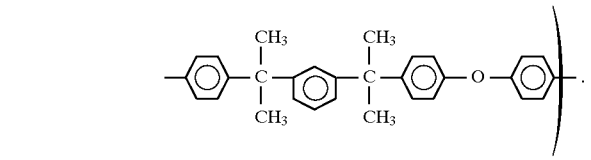

28 Claims, No Drawings

LIQUID CRYSTAL POLYAMIDE-IMIDE COPOLYMER

BACKGROUND OF THE INVENTION

1. Field of the Invention

The present invention relates to ① a liquid crystal polyamide-imide copolymer and a preparation process of the same, ② a sliding material primarily comprising liquid crystal polyamide, liquid crystal polyimide or a liquid crystal polyamide-imide copolymer, ③ a heat-resistant filament prepared from liquid crystal polyamide, liquid crystal polyimide or a liquid crystal polyamide-imide copolymer, and, ④ an extremely heat-resistant molded item, film, filament or sliding material prepared by heat-treating the molded item, film, filament or sliding material which is obtained from liquid crystal polyamide, liquid crystal polyimide or a liquid crystal polyamide-imide copolymer.

2. Related Art of the Invention

Polyamide, polyimide and polyamideimide polymers have high heat resistance and, additionally, are excellent in dimensional stability and dynamic strength together with flame retardance and electrical insulation property. Consequently, these polymers have been conventionally used in the field of electric and electronic appliances, space and aeronautical instruments, and transport machinery. It is expected in the future to widely use these polymers in various fields which require heat resistance. Accordingly, there have been developed polyamide, polyimide and polyamideimide polymers which exhibit various excellent characteristics.

However, in the present state of the art, these conventional polymers individually have both merits and drawbacks in their properties. Some polymers are excellent in heat resistance, but are poor in processing ability. Other polymers have been developed in order to primarily improve processing ability and thus have inferior resistance to heat and solvents.

For example, it has been reported in J. Polym. Sci. Macromal Rev., 11, 161 (1976) that polyimide having fundamental skeletons of the formula (A):

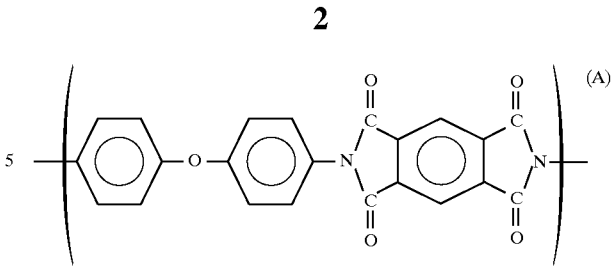

(Kapton and Vespel, Trade Mark of E. I. du Pont Nemours & Co.) has no distinct glass transition temperature, is excellent in heat resistance, and has been applied to practical uses by employing these characteristics in the form of films and molded items. The polyimide has a straight chain polymer structure and is highly crystalline. Consequently, the polyimide filament has been studied alone in M.M. Koton, Polym Set. USSR, 21, 2756 (1980), although the polymer is suited for the raw material of a filament high strength and high elastic modulus. Further, in the polyimide filaments obtained, the filament of poly(4,4'-biphenylenepyromellitic imide) which has a relatively high strength has strength of only 6.9 g/d. Processing into the filament is carried out by wet spinning in many cases in view of processing ability and filament preparation by melt spinning is not employed in most cases.

Furthermore, the polyimide is difficult to process as a molding material and means such as sinter molding is required. The polyimide also has high moisture absorption which gives an adverse effect on the dimensional stability, insulation property and solder heat resistance and thus causes problems in the case of using for the raw material of electric and electronic parts.

In view of the above situation, the present inventors have developed polyimide having recurring structural units of the formula (B):

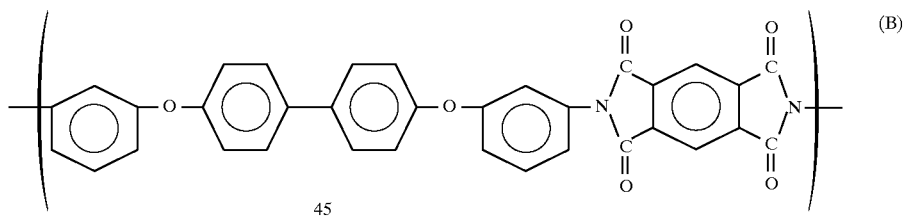

(Japanese Laid-Open Patent Sho 62-205124).

The polyimide has a glass transition temperature (hereinafter referred to as Tg) of 260° C., crystallization temperature of 310°~340° C., and crystal melting temperature 367°~385° C. The resin is excellent in heat resistance, can be processed in a molten state, and also has excellent resistance to chemicals and solvents. On the other hand, the resin has poor melt flowability in the case of a high molecular weight resin and requires a high temperature of 400° C. for molding the resin. Thus, further improvement has been required in molding ability.

In the next step, the present inventors have developed polyimide having recurring structural units of the formula (C):

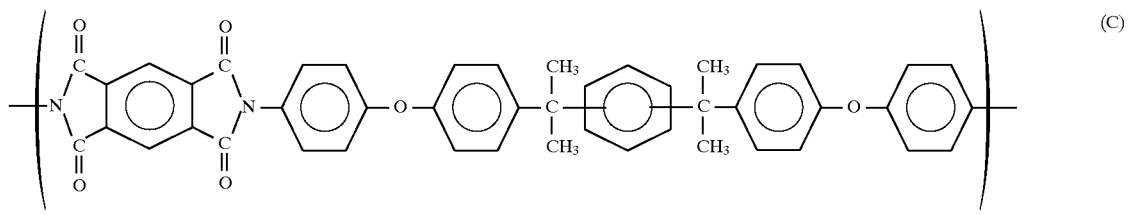
(C)

which are the recurring structural units of the liquid crystal polyimide-imide copolymer in the present invention (Japanese Laid-Open Patent Hei 03-160024). The polyimide resin has Tg of 236°~246° C. and a melting point (hereinafter referred to as Tm) of 292°~340° C. Thus, the resin maintains heat resistance and simultaneously is excellent in melt flowability, processing ability and resistance to chemicals and solvents.

The present inventors have also found that, in the polyimide resin represented by the formula (C), polyimide having recurring structural units of the formula (D):

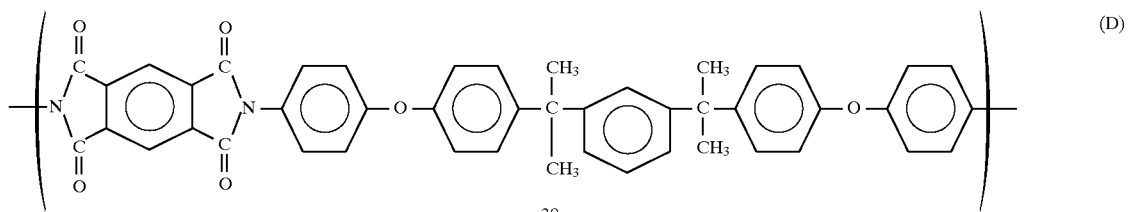
(D)

is thermotropic liquid crystal aromatic polyimide which exhibits liquid crystal properties in the temperature range of 270°~300° C. (J. Polym. Sci., Part A, Polym Chem., Vol. 32, 2111~2118 (1994)). The polyimide resin shows very good melt flowability in an injection molding process.

However, the upper limit of the temperature range which shows thermotropic liquid crystal properties and the flow initiation temperature are not sufficiently low and thus processing ability of the resin is unsatisfactory.

The present inventors have further found that polyamide having recurring structural units of the formula (E):

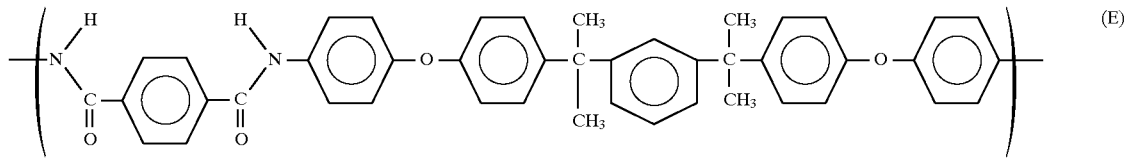
(E)

is a novel aromatic polyamide (Japanese Laid-Open Patent Hei 3-185023). However, the polyamide is also not sufficiently low in the upper limit of the temperature range which shows thermotropic liquid crystal properties and in the flow initiation temperature. Thus, the processing ability of the resin is unsatisfactory.

SUMMARY OF THE INVENTION

The first object of the invention is to provide a liquid crystal polyamide-imide copolymer which is excellent in heat resistance and mechanical characteristics, and additionally has outstanding processing ability and thermotropic liquid crystal properties, and is also superior in resistance to moisture absorption, chemicals and solvents and to provide a preparation process of the same.

The second object of the invention is to provide a sliding material which primarily comprises a liquid crystal polyamide-imide copolymer, liquid crystal polyamide polymer or liquid crystal polyimide polymer and has excellent heat resistance together with outstanding processing ability, lubricating property, sliding characteristic and mechanical property.

The third object of the invention is to provide a heat-resistant filament which comprises a liquid crystal polyamide-imide copolymer, liquid crystal polyamide polymer or liquid crystal polyimide polymer, and has excellent heat resistance and mechanical property together with very low moisture absorption, outstanding electrical property and superior resistance to solvents and chemicals, and can be prepared by melt processing method.

The fourth object of the invention is to provide a molded item, film, filament or sliding material which primarily comprises a liquid crystal polyamide-imide copolymer, liquid crystal polyamide polymer or liquid crystal polyimide polymer and has very excellent heat resistance. A still further object of the invention is to provide a method for extremely improving the heat resistance of a molded item, film, filament or a sliding material which comprises a liquid crystal polyamide-imide copolymer, liquid crystal polyamide polymer or liquid crystal polyimide polymer.

As a result of an intensive investigation in order to accomplish the above objects, the present inventors have found that a liquid crystal polyamide-imide copolymer having recurring structural units of the formula (1) and formula (2):

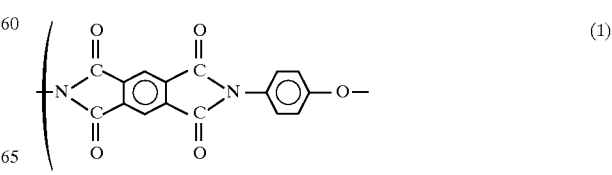
(1)

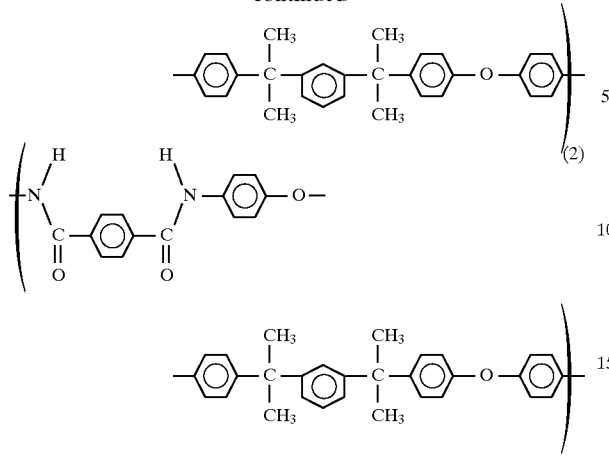

has excellent processing ability, heat resistance and mechanical characteristic. Thus, the present invention has been completed.

The inventors have also found that the liquid crystal polyamide-imide copolymer can provide a high heat resistant sliding material and a heat resistant filament on the basis of the superior processing ability of the copolymer, that the liquid crystal polyimide having recurring structural units of the formula (1) and the liquid crystal polyamide having recurring structural units of the formula (2) can also provide a sliding material having excellent heat resistance, and a heat resistant filament, and further that the molded item, filament, film and sliding material comprising the above liquid crystal polyamide-imide copolymer, liquid crystal polyimide or liquid crystal polyamide can be provided with further enhanced heat resistance by heat treatment. Thus, the present invention has been completed.

That is, the first aspect of the invention is a liquid crystal polyamide-imide copolymer comprising in a polymer molecule 0.05~0.95 mole ratio of the recurring structural units of the formula (1):

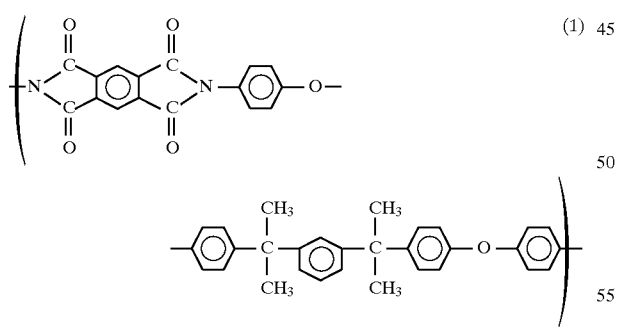

and 0.95~0.05 mole ratio of recurring structural units of the formula (2):

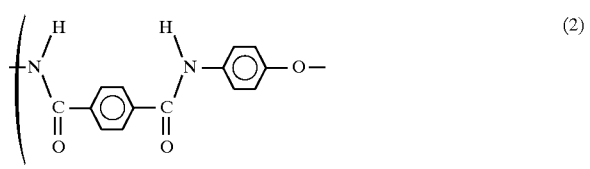

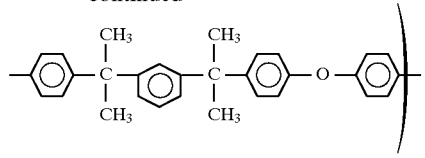

more preferably comprising 0.1~0.9 mole ratio of the recurring structural units of the above formula (1) and 0.9~0.1 mole ratio of the recurring structural units of the above formula (2); a liquid crystal capped polyamide-imide copolymer obtained by capping the polymer chain end of the copolymer with aromatic dicarboxylic anhydride represented by the general formula (3), an aromatic monocarboxylic acid derivative represented by the general formula (4), aromatic mono-amine represented by the general formula (5) or a mixture of these compounds (hereinafter referred to simply as an end-capping agent for the polymer molecule) and a preparation process of these liquid crystal copolymers.

In the general formula (3), Z is a divalent radical having 6~15 carbon atoms and selected from the group consisting of a monoaromatic radical, condensed polyaromatic radical and noncondensed aromatic radical connected to each other with a direct bond or a bridge member.

In the general formula (4), Y is a monovalent radical having 6~15 carbon atoms and selected from the group consisting of a monoaromatic radical, condensed polyaromatic radical and noncondensed aromatic radical connected to each other with a direct bond or a bridge member, and X is a halogen atom.

In the general formula (5), V is a monovalent radical having 6~15 carbon atoms and selected from the group consisting of monoaromatic radical, condensed polyaromatic radical and noncondensed aromatic radical connected to each other with a direct bond or a bridge member.

The second aspect of the invention is a sliding material comprising the liquid crystal polyimide having recurring structural units of the formula (1), liquid crystal polyamide having recurring structural units of the formula (2) or the liquid crystal polyamide-imide copolymer having recurring structural units of the formula (1) and formula (2) (hereinafter referred to simply as polymer or copolymer); or comprising the liquid crystal capped polyamide-imide copolymer, the liquid crystal capped polyimide or the liquid crystal capped polyamide which is obtained by capping the molecular chain end of the polymer or copolymer with the end-capping agent; and primarily comprising the above polymer or copolymer having an inherent viscosity of 0.4~3.0 dl/g and a melt viscosity of 250~1,000,000 poise under the loading pressure of 300 kg/cm$^2$ at 360° C. The invention is a sliding material preferably comprising one or more of other components selected from a fluoro resin, graphite and carbon fiber in a total amount of 1~150 parts by weight for 100 parts by weight of the above polymer or copolymer and more preferably comprising one or more fluoro resins selected from the group consisting of the following (a) to (f).

(a) Tetrafluoroethylene resin having recurring structural units of the formula —(CF$_2$CF$_2$)— in the molecule.

(b) Tetrafluoroethylene-hexafluoropropylene copolymer resin having recurring structural units of the formula —(CF$_2$CF$_2$)— and the formula —(CF(CF$_3$)CF$_2$)— in the molecule.

(c) Tetrafluoroethylene-perfluoroalkyl vinyl ether copolymer resin having recurring structural units of the formula —(CF$_2$CF$_2$)— and the formula (CF(OC$_m$F$_{2m+1}$)CF$_2$)—, wherein m is an integer of 10 or less, in the molecule.

(d) Tetrafluoroethylene-ethylene copolymer resin having recurring structural units of the formula —(CF$_2$CF$_2$)— and the formula —(CH$_2$CH$_2$)— in the molecule.

(e) Trifluorochloroethylene-ethylene copolymer resin having recurring structural units of the formula —(CFClCF$_2$)— and the formula —(CH$_2$CH$_2$)— in the molecule.

(f) Fluorovinylidene resin having recurring structural units of the formula —(CF$_2$CH$_2$)— in the molecule.

The third aspect of the invention is a heat resistant filament primarily comprising the above polymer or copolymer, or a capped polymer or copolymer obtained by capping the above polymer or copolymer at the molecular chain end with the end-capping agent and is preferably a spun filament comprising less than 50 parts by weight of metal powder for 100 parts by weight of the above polymer or copolymer.

The fourth aspect of the invention is a molded item, film, filament or a sliding material having further enhanced heat resistance which is obtained by preparing a molded item, film, filament or a sliding material from the resin primarily comprising the above polymer or copolymer or the capped polymer or copolymer obtained by capping the above polymer or copolymer at the molecular chain end with the end-capping agent and successively by heat-treating the molded item, film, filament or the sliding material thus obtained at temperature of 180°~300° C. for 10 minutes to 24 hours.

The liquid crystal polyamide-imide copolymer of the invention has superior heat resistance and mechanical properties, is simultaneously excellent in water absorption resistance and resistance to chemicals and solvents, synergistically lowers melt initiation temperature, has good applicability to processing, and can be expected to have extended uses in processing.

The sliding material or the heat resistant filament primarily comprising the liquid crystal polyamide-imide copolymer, liquid crystal polyamide polymer or liquid crystal polyimide polymer of the invention is excellent in heat resistance, processing ability, chemical resistance, mechanical characteristics, electrical property and solvent resistance has low moisture absorption, and thus can be applied to various uses.

Further, the molded item, film, filament and the sliding material primarily comprising the liquid crystal polyamide-imide copolymer, liquid crystal polyamide polymer or the liquid crystal polyimide polymer of the invention further enhance heat resistance by heat-treatment and can further extend these uses.

DETAILED DESCRIPTION OF THE INVENTION

The liquid crystal polyamide-imide copolymer in the invention has in the polymer molecule recurring structural units of the formula (1):

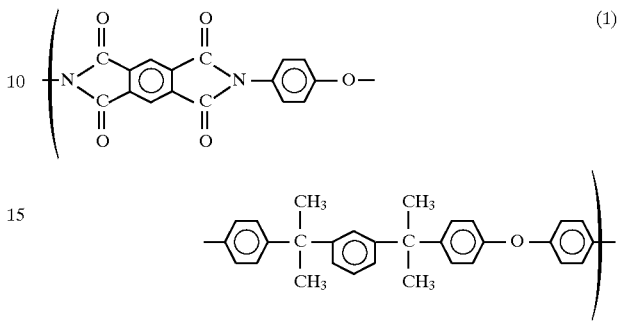

and recurring structural units of the formula (2):

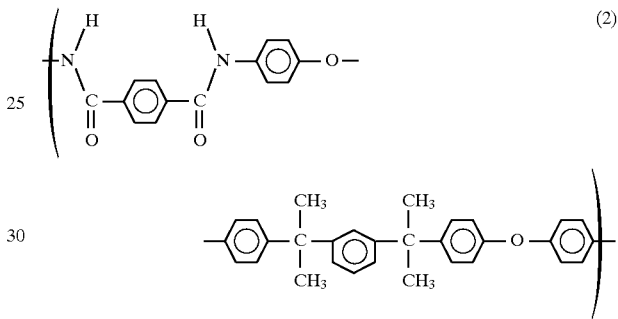

As to the proportion of these recurring structural units, the units of the formula (1) has a mole ratio of 0.05~0.95, preferably 0.1~0.9 and the units of the formula (2) has a mole ratio of 0.95~0.05, preferably 0.9~0.1. When the mole ratio is in this range, the liquid crystal polyamide-imide copolymer of the invention synergistically lowers the melt initiation temperature and has excellent processing ability.

The liquid crystal polyamide-imide copolymer can also be capped at the molecular chain end with aromatic dicarboxylic anhydride of the above general formula (3), the aromatic monocarboxylic acid derivative of the above general formula (4), aromatic monoamine of the above general formula (5), or a mixture of these end-capping agents for the polymer molecule.

The liquid crystal polyimide, liquid crystal polyamide or liquid crystal polyamide-imide copolymer which can be used for the heat resistant filament and sliding material in the invention, or the molded item, filament, film and sliding material to be heat-treated in order to enhance heat resistance comprises one or more kinds of recurring structural units of the formula (1) and recurring structural units of the formula (2).

That is, the polymer and copolymer include:

① liquid crystal polyimide having recurring structural units of the formula (1):

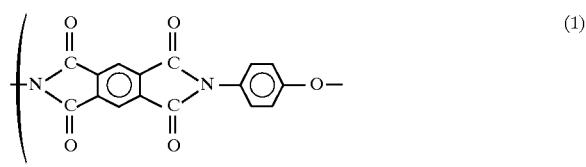

-continued

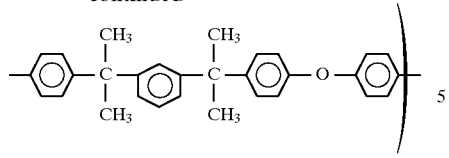

or liquid crystal capped polyimide obtained by capping at the molecular chain end with aromatic dicarboxylic anhydride of the above general formula (3) and/or aromatic monoamine of the above general formula (5), ② liquid crystal polyamide having recurring structural units of the formula (2):

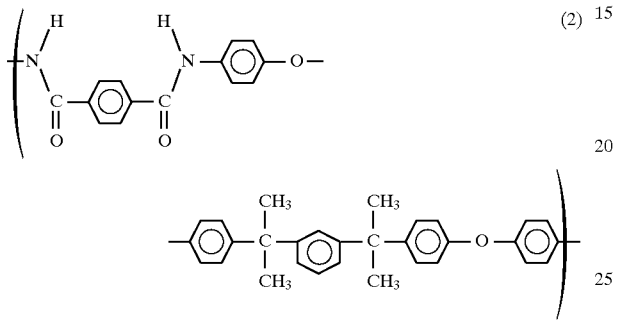

or liquid crystal capped polyamide obtained by capping at the molecular chain end with the aromatic monocarboxylic acid derivative of the above general formula (4) and/or aromatic monoamine of the above general formula (5), and ③ liquid crystal polyamide-imide copolymer comprising in the polymer molecule less than 1 mole ratio, preferably 0.05~0.95 mole ratio of recurring structural units of the formula (1) and less than 1 mole ratio, preferably 0.95~0.05 mole ratio of recurring structural units of the formula (2), or liquid crystal capped polyamide-imide copolymer obtained by capping at the molecular chain end with aromatic dicarboxylic anhydride of the above general formula (3), the aromatic monocarboxylic acid derivative of the above general formula (4), aromatic monoamine of the above general formula (5), or a mixture of these end-capping agents for the polymer molecule.

The liquid crystal polyamide-imide copolymer of the invention and liquid crystal polyamide, liquid crystal polyimide or liquid crystal polyamide-imide copolymer which is used in the invention have an inherent viscosity of generally 0.4~3.0 dl/g, preferably 0.45~2.5 dl/g, more preferably 0.5~2.0 dl/g.

The above copolymer of the invention and the polymer or copolymer used in the invention can be prepared by the following process.

The liquid crystal polyamide-imide copolymer of the invention can be prepared by reacting 1,3-bis[4-(4-aminophenoxy)-α,α-dimethylbenzyl]benzene of the formula (6)

with pyromellitic dianhydride of the formula (7):

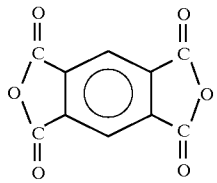

and a terephthalic acid derivative of the general formula (8):

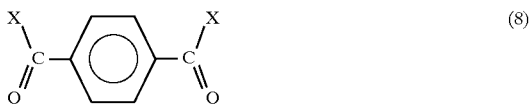

wherein X is a halogen atom, and thermally or chemically imidizing the polyamide-amic acid thus obtained.

1,3-Bis[4-(4-aminophenoxy)-α,α-dimethylbenzyl]benzene of the formula (6) is used in an amount of 0.9~1.1 moles, preferably 0.95~1.05 moles for 1 mole of the total amount of pyromellitic dianhydride of the formula (7) and the terephthalic acid derivative of the formula (8).

No particular limitation is imposed upon the reaction temperature, reaction pressure and reaction time in the preparation of the above polyamide-amic acid copolymer. The reaction can sufficiently progress at room temperature under atmospheric pressure for 2~12 hours.

The reaction is usually carried out in an organic solvent. No particular restriction is imposed upon the organic solvent. Representative solvents include, for example, N,N-dimethylformamide, N,N-dimethylacetamide, N,N-diethylacetamide, N,N-dimethylmethoxyacetamide, N-methyl-2-pyrrolidone, 1,3-dimethyl-3-imidazolidinone, N-methylcaprolactam, 1,2-dimethoxyethane, bis(2-methoxyethyl)ether, 1,2-bis(2-methoxyethoxy)ethane, bis[2-(2-methoxyethoxy)ethyl]ether, tetrahydrofuran, 1,3-dioxane, 1,4-dioxane, xylene, pyridine, picoline, dimethyl sulfoxide, dimethyl sulfone, tetramethylurea, hexamethylphosphoramide, phenol, o-cresol, m-cresol, p-cresol, m-cresylic acid, p-chlorophenol and anisole. These organic solvent can be used singly or as a mixture.

The reaction is carried out in the presence of a dehydrohalogenating agent. Exemplary dehydrohalogenating agents which can be used include triethylamine, tributylamine, tripentylamine, N,N-dimethylaniline, N,N-diethylaniline, pyridine, α-picoline, β-picoline, γ-picoline, 2,4-lutidine, 2,6-lutidine, quinoline, isoquinoline, sodium hydroxide, potassium hydroxide, sodium carbonate, potassium carbonate, lithium carbonate, sodium hydrogen carbonate, calcium oxide, lithium oxide, ethylene oxide and propylene oxide. In these dehydrohalogenating agents, triethylamine and propylene oxide are preferred.

No particular restriction is put upon the order of monomer charge.

When the dehydrohalogenating agent is used, the raw materials are preferably charged in order of 1,3-bis[4-(4-aminophenoxy)-α,α-dimethylbenzyl]benzene, pyromellitic dianhydride, dehydrohalogenating agent, and the terephthalic acid derivative.

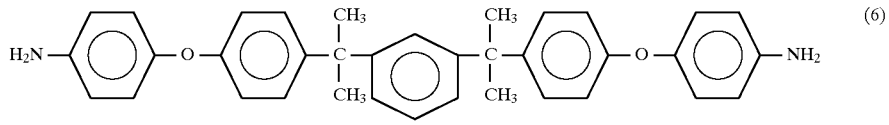

Any terephthalic acid derivative shown by the above general formula (8) can be used in the invention. Terephthalic acid chloride is most preferred.

Polyamide-amic acid thus obtained is thermally or chemically imidized to obtain the polyamide-imide copolymer. The imidization is carried out, when necessary, in the presence of an organic base catalyst which is usually used for the preparation of polyimide. Exemplary organic base catalysts include triethylamine, tributylamine, tripentylamine, N,N-dimethylaniline, N,N-diethylaniline, pyridine, α-picoline, β-picoline, γ-picoline, 2,4-lutidine, 2,6-lutidine, quinoline and isoquinoline, pyridine and γ-picoline are preferably used.

The imidization can be carried out by any known processes which include:

1) a process for removing the solvent under decreased temperature by means such as distillation under reduced pressure or for pouring the obtained polyamide-amic acid solution into a lean solvent and for successively heat-imidizing 2) a proolyimide-amic acid, 2) a process for carrying out chemical imidization by adding a dehydrating agent such as acetic anhydride to the polyamide-amic acid solution obtained and further adding a catalyst, when needed, 3) a process for simultaneously carrying out solvent removal and heat-imidization by reduced pressure treatment or heat treatment, and 4) a process for carrying out heat imidization in the presence of a catalyst, azeotropic agent or dehydrating agent, when necessary.

No particular limitation is imposed upon the reaction temperature, reaction pressure and reaction time in the imidization reactions of the above 1)~4). The reaction can be satisfactorily carried out under known imidization conditions, for example, at room temperature under atmospheric pressure for 2~12 hours.

These preparation processes can provide the liquid crystal polyamide-imide copolymer of the invention or the liquid crystal polyamide-imide copolymer which is used in the invention.

The polyamide-imide copolymer having synergistically excellent melt initiation temperature can be obtained by using pyromellitic dianhydride of the formula (7) and the terephthalic acid derivative of the general formula (8) in a mole ratio of 0.05~0.95/0.95~0.05. The liquid crystal polyamide-imide copolymer prepared outside of the above range of mole ratio can also be used for the invention. However, the copolymer prepared within the above range of mole ratio is preferably used for the invention.

The liquid crystal polyamide-imide copolymer which has further enhanced heat stability and processing ability due to capping at the end of molecular chain with an end-capping agent for the polymer molecule can be prepared by the following process.

That is, the reaction of the above liquid crystal polyamide-imide copolymer is carried out in the presence of the end-capping agents which include:

aromatic dicarboxylic anhydride of the general formula (3):

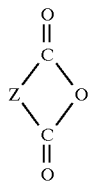
(3)

wherein Z is a divalent radical which has 6~15 carbon atoms and is selected from the group consisting of a monoaromatic radical, condensed polyaromatic radical and noncondensed aromatic radical connected to each other with a direct bond or a bridge member, an aromatic monocarboxylic acid derivative of the general formula (4):

wherein Y is a monovalent radical which has 6~15 carbon atoms and is selected from the group consisting of a monoaromatic radical, condensed polyaromatic radical and noncondensed aromatic radical connected to each other with a direct bond or a bridge member, and X is a halogen atom, and aromatic monoamine of the general formula (5):

wherein V is a monovalent radial which has 6~15 carbon atoms and is selected from the group consisting of a monoaromatic radical, condensed polyaromatic radical and noncondensed aromatic radical connected to each other with a direct bond or a bridge member.

Representative aromatic dicarboxylic anhydride, aromatic monocarboxylic acid derivative and aromatic monoamine are, for example, the following compounds.

① Aromatic dicarboxylic anhydride includes:
phthalic anhydride, 2,3-benzophenonedicarboxylic anhydride, 3,4-benzophenonedicarboxylic anhydride, 2,3-dicarboxyphenylphenyl ether anhydride, 3,4-dicarboxyphenylphenyl ether anhydride, 2,3-biphenyldicarboxylic anhydride, 3,4-biphenyldicarboxylic anhydride, 2,3-dicarboxyphenylphenyl sulfone anhydride, 3,4-dicarboxyphenylphenyl sulfone anhydride, 2,3-dicarboxyphenylphenyl sulfide anhydride, 3,4-dicarboxyphenylphenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride, and 1,9-anthracenedicarboxylic anhydride.

② The aromatic monocarboxylic acid derivative includes:
benzoyl chloride, naphthalenecarbonyl chloride, benzophenonecarbonyl chloride and diphenyl ether carbonyl chloride.

③ Aromatic monoamine includes:
aniline, o-toluidine, m-toluidine, p-toluidine, 2,3-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-aminophenol, m-aminophenol, p-aminophenol, o-anisidine, m-anisidine, p-anisidine, o-phenetidine, m-phenetidine, p-phenetidine, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophenyl phenyl ether, 2-aminobenzophenone, 3-aminobenzophenone, 4-aminobenzophenone, 2-aminophenyl phenyl sulfide, 3-aminophenyl phenyl sulfide, 4-aminophenyl phenyl sulfide, 2-aminophenyl phenyl sulfone, 3-aminophenyl phenyl sulfone, 4-aminophenyl phenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-1-naphthol, 8-amino-2-naphthol, 1-aminoanthracene, 2-aminoanthracene and 9-aminoanthracene. In these end-capping agents, phthalic anhydride, benzoyl chloride and aniline are preferably used.

The end-capping agent for the polymer molecule is used by selecting a suitable compound depending upon the amount of the raw material monomer from the above aromatic dicarboxylic anhydride, aromatic monocarboxylic acid derivative and aromatic monoamine. A mixture of the end-capping agent can also be used, when necessary.

Aromatic dicarboxylic anhydride or the aromatic monocarboxylic acid derivative as the end-capping agent for the polymer molecule is usually used in the case of preparing the liquid crystal capped polyamide-imide copolymer by using an excess mole ratio of the diamine monomer to the total mole of pyromellitic dianhydride, i.e., the other monomer and the terephthalic acid derivative. Aromatic dicarboxylic anhydride and the aromatic monocarboxylic acid derivative can be used singly or as a mixture.

In both single and mixed uses of the end-capping agent, the total amount of the end-capping agent is 0.001~1.0 mole for 1 mole of 1,3-bis[4-(4-aminophenoxy)-α,α-dimethylbenzyl]benzene of the above formula (6). When the amount is less than 0.001 mole, heat stability of the copolymer becomes poor and gives adverse effect on the processing ability. On the other hand, an amount exceeding 1.0 mole unfavorably decreases mechanical properties.

Aromatic monoamine as the end-capping agent for the polymer molecule is usually used in the case of preparing the liquid crystal capped polyamide-imide copolymer by using excess mole ratio of the sum of the pyromellitic dianhydride monomer and the terephthalic acid derivative to one mole of diamine, i.e., the other monomer. The amount of aromatic monoamine is 0.001~1.0 mole for 1 mole of the sum of pyromellitic dianhydride and the terephthalic acid derivative. When the amount is less than 0.001 mole, heat stability of the copolymer becomes poor and gives adverse effect on the processing ability. On the other hand, the amount exceeding 1.0 mole unfavorably decreases mechanical properties.

The methods for carrying out the reaction in the presence of the above end-capping agent in order to cap the molecular chain end of the polymer include: p1 (a) a method for reacting pyromellitic dianhydride, the terephthalic acid derivative and diamine, successively adding the end-capping agent and continuing the reaction, (b) a method for reacting diamine with the end-capping agent (aromatic dicarboxylic anhydride and/or the aromatic monocarboxylic acid derivative) and successively adding pyromellitic dianhydride and the terephthalic acid derivative to continue the reaction, and an alternative method for reacting tetracarboxylic dianhydride with the end-capping agent (aromatic monoamine) and successively adding diamine to continue the reaction, and (c) a method for reacting pyromellitic dianhydride, the terephthalic acid derivative, diamine and the end-capping agent are charged at the same time to carry out the reaction.

Any of the above methods lead to quite no problem.

The above process can provide the liquid crystal polyamide-imide copolymer of the invention and the liquid crystal polyamide-imide copolymer to be used for the invention.

Physical properties of the copolymer prepared by the process differ depending upon copolymerization ratio, charging ratio, polymerization condition and measuring condition and usually exhibit values within the following ranges. That is, the liquid crystal temperature region (observed by the naked eye with a polarized microscope under a temperature increase rate of 20° C./min) is 200°~340° C., the glass transition temperature (measured by DSC) is 150°~250° C., and the flow initiation temperature (measured with a Koka type flow tester using an orifice having a diameter of 0.1 cm and length of 1 cm under pressure of 100 kg/cm$^2$) is 350° C. or less.

The inherent viscosity of the copolymer is preferably 0.4~3.0 dl/g in view of heat stability, mechanical property and processing ability.

Next, the liquid crystal polyimide and the liquid crystal polyamide which are used in the invention are prepared by the following process.

The liquid crystal polyimide having recurring structural units of the formula (1) is prepared by reacting 1,3-bis[4-(4-aminophenoxy)-α,α-dimethylbenzyl]benzene of the above formula (6) with pyromellitic dianhydride of the above formula (7). Any of the amount of the raw material monomer, reaction condition and reaction method are the same as in the case of preparing the above liquid crystal polyamide-imide copolymer.

The liquid crystal polyimide capped at the end of the polymer molecule is prepared by reacting raw material monomers in the presence of aromatic dicarboxylic anhydride of the general formula (3) and/or aromatic monoamine of the general formula (5). On carrying out the reaction, any of the amount of the end-capping agent for the polymer molecule, reaction condition and reaction method are the same as in the case of preparing the above end-capped liquid crystal polyamide-imide copolymer.

The dehydrohalogenating agent is not required for these processes.

The liquid crystal polyamide having recurring structural units of the formula (2) is prepared by reacting 1,3-bis[4-(4-aminophenoxy)-α,α-dimethylbenzyl]benzene of the above formula (6) with the terephthalic acid derivative of the above formula (8). Any of the amount of the raw material monomers, reaction condition and reaction method are based upon the case of preparing the above end-capped liquid crystal polyamide-imide copolymer.

The liquid crystal polyamide capped at the end of the polymer molecule is prepared by reacting the raw material monomers in the presence of the aromatic monocarboxylic acid derivative of the general formula (4) and/or aromatic monoamine of the general formula (5). On carrying out the reaction, any of the amount of the end-capping agent for the polymer molecule, reaction condition and reaction method are based upon the case of preparing the above liquid crystal polyamide-imide copolymer.

Preparation of the liquid crystal polyamide is usually preferred to be carried out in the presence of a dehydrohalogenating agent. The kind and amount of the dehydrohalogenating agent is the same as in the above processes.

On preparation of the above liquid crystal polyamide-imide copolymer, liquid crystal polyimide or liquid crystal polyamide, 1,3-bis[4-(4-aminophenoxy)-α,α-dimethlbenzyl]benzene of the above formula (6), pyromellitic dianhydride of the above formula (7) and terephthalic acid derivative of the above formula (8) which are used for the raw material monomer can be portionally replaced by other diamine, tetracarboxylic dianhydride and dicarboxylic acid derivatives, respectively, in the range giving no adverse effect on the good properties of the product in the invention.

The diamine compound which can be used for partial substitution is represented by the general formula (9):

$$H_2N-R_1-NH_2 \qquad (9)$$

On enumerating exemplary diamine compounds, the compounds wherein $R_1$ is an aliphatic radical include ethylenediamine, and 1,4-diaminobutane, the compounds wherein $R_1$ is an alicyclic radical include 1,4-diaminocyclohexane, the compounds wherein $R_1$ is a monoaromatic radical include m-phenylenediamine, o-phenylenediamine, p-phenylenediamine, m-aminobenzylamine,
p-aminobenzylamine, and diamino toluene, the compounds wherein $R_1$ is a condensed polyaromatic radical include 2,6-diaminonaphthalene, the compounds wherein $R_1$ is a noncondensed aromatic radical connected each other with a direct bond include 4,4'-diaminobiphenyl and 4,3'-diaminobiphenyl, and the compounds wherein $R_1$ is a noncondensed aromatic radical connected each other with a bridge member include
3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfoxide, 3,4'-diaminodiphenyl sulfoxide,
4,4'-diaminodiphenyl sulfoxide, 3,3'-diaminodiphenyl sulfone,
3,4'-diaminodiphenyl sulfone, 4,4'-diaminodiphenyl sulfone,
3,3'-diaminobenzophenone, 3,4'-diaminobenzophenone, 4,4'-diaminobenzophenone, 3,3'-diaminodiphenylmethane,
3,4'-diaminodiphenylmethane, 4,4'-diaminodiphenylmethane,
bis[4-(4-aminophenoxy)phenyl]methane,
1,1-bis[4-(4-aminophenoxy)phenyl]ethane,
1,2-bis[4-(4-aminophenoxy)phenyl]ethane,
1,1-bis[4-(4-aminophenoxy)phenyl]propane,
1,2-bis[4-(4-aminophenoxy)phenyl]propane,
1,3-bis[4-(4-aminophenoxy)phenyl]propane,
2,2-bis[4-(4-aminophenoxy)phenyl]propane,
1,1-bis[4-(4-aminophenoxy)phenyl]butane,
1,2-bis[4-(4-aminophenoxy)phenyl]butane,
1,3-bis[4-(4-aminophenoxy)phenyl]butane,
1,4-bis[4-(4-aminophenoxy)phenyl]butane,
2,2-bis[4-(4-aminophenoxy)phenyl]butane,
2,3-bis[4-(4-aminophenoxy)phenyl]butane,
2-[4-(4-aminophenoxy)phenyl]-2-[4-(4-aminophenoxy)-3-methylphenyl]propane
2,2-bis[4-(4-aminophenoxy)-3-methylphenyl]propane,
2-[4-(4-aminophenoxy)phenyl]-2-[4-(4-aminophenoxy)-3,5-dimethylphenyl]propane,
2,2-bis[4-(4-aminophenoxy)-3,5-dimethylphenyl]propane,
2,2-bis[4-(4-aminophenoxy)phenyl]-1,1,1,3,3,3-hexafluoropropane,
1,3-bis(3-aminophenoxy)benzene, 1,3-bis(4-aminophenoxy)benzene,
1,4-bis(3-aminophenoxy)benzene, 1,4-bis(4-aminophenoxy)benzene,
4,4'-bis(4-aminophenoxy)biphenyl, bis[4-(4-aminophenoxy)phenyl]ketone,
bis[4-(4-aminophenoxy)phenyl]sulfide,
bis[4-(4-aminophenoxy)phenyl]sulfoxide,
bis[4-(4-aminophenoxy)phenyl]sulfone,
bis[4-(3-aminophenoxy)phenyl]ether, bis[4-(4-aminophenoxy)phenyl]ether,
1,3-bis[4-(4-aminophenoxy)benzoyl]benzene,
1,3-bis[4-(3-aminophenoxy)benzoyl]benzene,
1,4-bis[4-(4-aminophenoxy)benzoyl]benzene,
1,4-bis[4-(3-aminophenoxy)benzoyl]benzene,
4,4'-bis[(3-aminophenoxy)benzoyl]benzene,
4,4'-bis(3-aminophenoxy)-3,3'-dimethylbiphenyl,
4,4'-bis(3-aminophenoxy)-3,5-dimethylbiphenyl,
4,4'-bis(3-aminophenoxy)-3,3',5,5'-tetramethylbiphenyl,
4,4'-bis(3-aminophenoxy)-3,3'-dichlorobiphenyl,
4,4'-bis(3-aminophenoxy)-3,3',5,5'-tetrachlorobiphenyl,
4,4'-bis(3-aminophenoxy)-3,5-dibromobiphenyl,
4,4'-bis(3-aminophenoxy)-3,3',5,5'-tetrabromobiphenyl,
bis[4-(3-aminophenoxy)-3-methoxyphenyl]sulfide,
bis[4-(3-aminophenoxy)-3,5-dimethoxyphenyl]sulfide,
[4-(3-aminophenoxy)phenyl][4-(3-aminophenoxy)-3,5-dimethyoxyphenyl]sulfide, 1,1-bis[4-(3-aminophenoxy)phenyl]propane,
1,3-bis[4-(3-aminophenoxy)phenyl]propane,
2,2-bis[4-(3-aminophenoxy)phenyl]propane,
2,2-bis[4-(3-aminophenoxy)phenyl]-1,1,1,3,3,3-hexafluoropropane,
4,4'-bis(3-aminophenoxy)biphenyl, bis[4-(3-aminophenoxy)phenyl]ketone,
bis[4-(3-aminophenoxy)phenyl]sulfide, and
bis[4-(3-aminophenoxy)phenyl]sulfone.

Tetracarboxylic dianhydrides which can be used for partial substitution have the general formula (10):

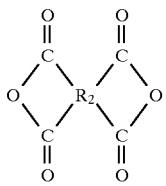
(10)

On enumerating specific compounds, the compounds wherein $R_2$ is an aliphatic radical include butanetetracarboxylic dianhydride, the compounds wherein $R_2$ is an alicyclic radical include cyclopentanetetracarboxylic dianhydride and cyclohexanetetracarboxylic dianhydride, the compounds wherein $R_2$ is a monoaromatic radical include 1,2,3,4-benzenetetracarboxylic dianhydride, the compounds wherein $R_2$ is a condensed polyaromatic radical include
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride and
1,2,7,8-phenanthrene tetracarboxylic dianhydride, the compounds wherein $R_2$ is a noncondensed aromatic radical connected to each other with a direct bond include 3,3',4,4'-biphenyltetracarboxylic dianhydride and 2,2',3,3'-biphenyltetracarboxylic dianhydride, and the compounds wherein $R_2$ is a noncondensed aromatic radical connected to each other with a bridge member include 3,3',4,4'-benzophenonetetracarboxylic dianhydride,2,2',3,3'-benzophenonetetracarboxylic dianhydride,
3,3',4,4'-biphenyltetracarboxylic dianhydride,
2,2',3,3'-biphenyltetracarboxylic dianhydride,
2,2-bis(3,4-dicarboxyphenyl)propane dianhydride,
2,2-bis(2,3-dicarboxyphenyl)propane dianhydride,
bis(2,3-dicarboxyphenyl)ether dianhydride,
bis(3,4-dicarboxyphenyl)ether dianhydride,
bis(2,3-dicarboxyphenyl)sulfone dianhydride,
bis(3,4-dicarboxyphenyl)sulfone dianhydride,
bis(2,3-dicarboxyphenyl)methane dianhydride,
bis(3,4-dicarboxyphenyl)methane dianhydride,
1,1-bis(2,3-dicarboxyphenyl)ethane dianhydride, 1,1-bis(3,4-dicarboxyphenyl)ethane dianhydride,
1,2-bis(2,3-dicarboxyphenyl)ethane dianhydride,
1,2-bis(3,4-dicarboxyphenyl)ethane dianhydride,
1,3-bis(2,3-dicarboxyphenoxy)benzene dianhydride,
1,3-bis(3,4-dicarboxyphenoxy)benzene dianhydride,
1,4-bis(2,3-dicarboxyphenoxy)benzene dianhydride,
1,4-bis(3,4-dicarboxyphenoxy)benzene dianhydride,
2,2'-bis[4-(3,4-dicarboxyphenoxy)phenyl]propane dianhydride and
bis[4-(3,4-dicarboxyphenoxy)]biphenyl dianhydride.

The dicarboxylic acid derivatives which can be used for partial substitution have the general formula (11):

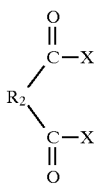

(11)

wherein X is a halogen atom.

Specifically, the compounds wherein $R_3$ is an aliphatic radical include oxalic acid derivatives and propylenedicarboxylic acid derivatives, the compounds wherein $R_3$ is an alicyclic radical include 1,2-cyclohexane dicarboxylic acid derivatives, the compounds wherein $R_3$ is a monoaromatic radical include phthalic acid derivatives and isophthalic acid derivatives, the compounds wherein $R_3$ is a condensed polyaromatic radical include 2,3-naphthalenedicarboxylic acid derivatives, 2,6-naphthalenedicarboxylic acid derivatives and 1,8-naphthalenedicarboxylic acid derivatives, the compounds wherein $R_3$ is a noncondensed aromatic radical connected to each other with a direct bond include biphenyl-2,2'-dicarboxylic acid derivatives and biphenyl-4,4'-dicarboxylic acid derivatives, and the compounds wherein $R_3$ is a noncondensed aromatic radical connected to each other with a bridge member include benzophenonedicarboxylic acid derivatives and biphenyldicarboxylic acid derivatives.

The liquid crystal polyamide-imide copolymer of the invention which is prepared by the above process has a lowered melt-flow initiation temperature, exhibits excellent melt-processing ability, and can be widely used for melt processing.

Other thermoplastic resin and fillers for common resin composition can be blended in the processing, when necessary, in a suitable amount so long as not impairing the object of the invention.

Thermoplastic resins which can be blended include, for example, polyethylene, polypropylene, polycarbonate, polysulfone, polyethersulfone, polyetherketone, polyphenylenesulfide, polyamide, polyimide, polyamide-imide exclusive of the polymer of the invention, polyetherimide, and modified polyphenyleneoxide.

Exemplary fillers which can be blended include graphite, carborundum, silica powder, molybdenom disulfide, fluoro resin and other abrasion resistance improvers; glass fiber, carbon fiber, boron fiber, silicon carbide fiber, carbon whisker, asbestos, metal fiber, ceramic fiber and other reinforcements; antimony trioxide, magnesium carbonate, calcium carbonate and other flame retardance improvers; clay, mica and other electrical property improvers; asbestos, silica, graphite and other tracking resistance improvers; barium sulfate, silica, calcium metasilicate, and other acid resistance improvers; iron powder, zinc powder, aluminum powder, copper powder and other thermal conductivity improvers; and glass bead, glass sphere, talc, diatomaceous earth, alumina, silicate balloon, hydrated alumina, metal oxide and colorant.

The sliding material of the invention comprises one or more fillers selected from fluoro resin, graphite and carbon fiber in an amount of generally 1~150 parts by weight, preferably 5~120 parts by weight, more preferably 10~100 parts by weight for 100 parts by weight of the liquid crystal polyamide-imide copolymer, liquid crystal polyimide or liquid crystal polyamide in the invention.

More specifically, for 100 parts by weight of the above polymer or copolymer, fluoro resin is preferably 100 parts by weight or less, more preferably 50 parts by weight or less, graphite is preferably 100 parts by weight or less, more preferably 60 parts by weight or less, and carbon fiber is preferably 100 parts by weight or less, more preferably 70 parts by weight or less. The resin composition comprising one or more fillers selected from fluoro resin, graphite and carbon fiber in excess of the above range is unsuited for a sliding resin composition because of very inferior mechanical properties or extremely poor processing ability.

The above term fluoro resin refers to a synthetic high polymer comprising fluorine atoms in the molecule. Fluoro resin is generally excellent in heat resistance, chemical resistance and electrical characteristics as compared with other high polymers and also has specific low friction characteristic and non-sticking property.

Exemplary fluoro resins include:

(a) a tetrafluoroethylene resin having recurring structural units of the formula; —(CF$_2$CF$_2$)— in the molecule, (b) a tetrafluoroethylene-hexafluoropropylene copolymer resin having recurring structural units of the formula; —(CF$_2$CF$_2$)— and the formula; —(CF(CF$_3$)CF$_2$)— in the molecule, (c) a tetrafluoroethylene-perfluoroalkyl vinylether copolymer resin having recurring structural units of the formula; —(CF$_2$CF$_2$)— and the formula; —(CF(OC$_m$F$_{2m+1}$)CF$_2$)—, wherein m is an integer of 1~10, in the molecule, (d) a tetrafluoroethylene-ethylene copolymer resin having recurring structural units of the formula; —(CF$_2$CF$_2$)— and the formula; —(CH$_2$CH$_2$)— in the molecule, (e) a trifluoromonochloroethylene-ethylene copolymer resin having recurring structural units of the formula; —(CFClCF$_2$)— and the formula; —(CH$_2$CH$_2$)— in the molecule, and (f) a fluorovinylidene resin having recurring structural units of the formula; —(CF$_2$CH$_2$)— in the molecule.

In these fluoro resins, the tetrafluoroethylene resin (a) (hereinafter referred to simply as PTFE) has particularly excellent properties and is most preferred.

The fluoro resin which can be used, when necessary, for the sliding material of the invention is commonly powder and has a particle size of usually 1~25 μm, preferably 5~10 μm.

No particular restriction is imposed upon the means for mixing various raw materials in order to prepare the sliding material of the invention. A method for individually charging each raw material to a fusion mixing machine, a method for previously using a general purpose mixing machine such as a Henschel mixer, ball mixer and ribbon blender, and any other mixing methods can be used. The sliding material of the invention can be mixed, when necessary, with a suitable amount of other thermoplastic resin or fillers used for common resin compositions so long as not impairing the object of the invention. These auxiliary materials are thermoplastic resin, abrasion resistance improvers, reinforcements, acid resistance improvers, thermal conductivity improvers and miscellaneous materials such as glass bead, glass sphere, talc, diatomaceous earth, alumina, silicate balloon, hydrated alumina, metal oxide and colorant. Any materials which can be used for the melt processing of the liquid crystal polyamide-imide copolymer of the invention can be used for the preparation of the sliding material. Oil such as silicone oil can be added in order to improve lubrication in the range giving no adverse effect on the object of the invention.

The sliding material of the invention can be processed by injection molding or extrusion forming with high productivity and uniformity of the product, although compression molding and sinter molding can of course be applied.

The sliding material of the invention can be widely used regardless of the hardness of the metal which comes into contact with the sliding material. Such metals include, for example, SUS, Fe, Al, Cu and other soft and hard metals. The sliding material can be used both with oil lubrication and without lubrication.

The heat resistant filament of the invention primarily comprises the liquid crystal polyamide-imide copolymer, liquid crystal polyimide or liquid crystal polyamide of the invention which is prepared by the above processes. The polymer or copolymer used for preparing the heat-resistant filament has an inherent viscosity of suitable 0.4~3.0 dl/g, preferably 0.45~2.5 dl/g, more preferably 0.5~2.0 dl/g in view of mechanical properties and processing ability.

The heat resistant filament of the invention uses the polymer or the copolymer as the primary ingredient and can be prepared with ease by solution spinning or melt spinning.

Solvents which can be used for the solution spinning are organic solvents and include, for example, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane-bis(2-methoxyethyl)ether, 1,2-bis(2-methoxyethoxy)ethane, bis[2-(2-methoxyethoxy)ethyl]ether, tetrahydrofuran, 1,3-dioxane, 1,4-dioxane, xylene, pyridine, picoline, dimethyl sulfoxide, dimethyl sulfone, tetramethylurea, hexamethylphosphoramide, phenol, o-cresol, m-cresol, p-cresol, m-cresylic acid, p-chlorophenol and anisole. These solvents can be used singly or as a mixture.

Melt spinning temperature of liquid crystal polyimide is generally 270°~450° C., preferably 280°~430° C., more preferably 290°~420° C. Melt spinning temperature of liquid crystal polyamide is 250°~410° C. in view of processing ability, preferably 270°~390° C., more preferably 290°~370° C. Melt spinning temperature of the liquid crystal polyamide-imide copolymer is, when the amide ingredient is 50% or less, usually 270°~450° C., preferably 280°~430° C., more preferably 290°~420° C., in view of processing ability and heat resistance. When the amide ingredient exceeds 50%, the spinning temperature is usually 250°~410° C., preferably 270°~390° C., more preferably 290°~370° C.

The heat-resistant filament of the invention can also be prepared by carrying out melt spinning in the state of polyamic acid which is the precursor of the above liquid crystal polyimide or liquid crystal polyamide-imide copolymer formed in preparing the polymer and copolymer and successively imidizing the filament thus obtained.

Further, the heat resistant filament of the invention primarily comprises liquid crystal polyamide-imide copolymer of the invention, liquid crystal polyimide or liquid crystal polyamide. Thus, additives can be added before spinning, when necessary, in the range not impairing the good properties of the filament of the invention. Exemplary additives include thermoplastic resin, abrasion resistance improvers, reinforcements, flame retardance improvers, electrical property improvers, tracking resistance improvers, acid resistance improvers, metal powder for filament reinforcement, and miscellaneous materials such as glass bead, glass sphere, talc, diatomaceous earth, alumina, silicate balloon, hydrated alumina, metal oxide and colorant. The amount of these additives is usually 50 parts by weight or less, preferably 1~40 parts by weight for 100 parts by weight of the polymer or copolymer.

The invention further includes a molded item, film, filament or sliding material which primarily comprises the liquid crystal polyamide-imide copolymer of the invention, liquid crystal polyimide or liquid crystal polyamide and has more enhanced heat resistance.

The molded item, film, filament or sliding material having such further enhanced heat resistance can be prepared by heat treating the molded item, film, filament or sliding material which is obtained by processing, with a common method, the copolymer of the invention or the polymer or copolymer used in the invention.

The molded item, film, filament and sliding material to be heat treated can be obtained by using the resin which primarily comprises the polymer or copolymer. Thus, additives can be added, when necessary, to the polymer or copolymer in the processing step so long as giving no adverse effect on the good properties of the polymer and copolymer.

The additives are the same as above and include thermoplastic resin, abrasion resistance improvers, reinforcements, flame retardance improvers, electrical property improvers, tracking resistance improvers, acid resistance improvers, thermal conductivity improvers and miscellaneous materials such as glass bead, glass sphere, talc, diatomaceous earth, alumina, silicate balloon, hydrated alumina, metal oxide and colorant. These additives can be used as a mixture of many kinds, when necessary, so long as not impairing the good properties of the molded item, film, filament and sliding material of the invention. No particular restriction is put upon the means for mixing the resin and additives. A method for individually charging each raw material to a melt-mixing machine, a method for previously mixing in a general purpose mixer such as a Henschel mixer, ball mixer and ribbon blender, and any other methods can be used.

Successively, the resin blend thus obtained is melt-processed with a known method to prepare the molded item, film, filament or sliding material to be subjected to heat treatment.

The molded item, film, filament or sliding material thus obtained is heat treated at temperature of 180°–300° C. for 10 minutes to 24 hours. Such a heat treatment method is generally carried out for many crystal polymers. On the other hand, the resin primarily comprising the liquid crystal polyamide-imide copolymer of the invention or liquid crystal polyimide or liquid crystal polyamide to be used in the invention has no crystalline structure. When the molded item, film, filament or sliding material is observed after heat treatment by X-ray diffraction (XRD), a peak which shows crystalline structure cannot be observed.

The high heat-resistant molded item, film, filament or sliding material of the invention can continuously regulate heat resistance (heat distortion temperature; HDT) with good reproducibility by changing heat-treatment conditions such as temperature, time and atmosphere. Consequently, the molded item, film, filament or sliding material which has further enhanced heat resistance can be obtained.

The heat-treatment temperature is usually 180°~300° C., preferably in the range shown in Table 1, more preferably in the range shown in Table 2 according to the mole ratio of recurring structural units of the above formula (1) and that of the above formula (2) in the molecule of the polymer or copolymer which is a primary ingredient of the resin used in the invention.

TABLE 1

| Mole ratio R of recurring structural units | | Heat treatment |
|---|---|---|
| Formula (I) ($R_1$) | Formula (II) ($R_2$) | temperature (°C.) |
| $0.9 < R_1 < 1$ | $0 \leq R_2 < 0.1$ | $210 \leq T \leq 300$ |
| $0.6 < R_1 \leq 0.9$ | $0.1 \leq R_2 < 0.4$ | $200 \leq T \leq 280$ |
| $0.3 < R_1 \leq 0.6$ | $0.4 \leq R_2 < 0.7$ | $190 \leq T \leq 260$ |
| $0 \leq R_1 \leq 0.3$ | $0.7 \leq R_2 \leq 1$ | $180 \leq T \leq 260$ |

TABLE 2

| Mole ratio R of recurring structural units | | Heat treatment |
|---|---|---|
| Formula (I) ($R_1$) | Formula (II) ($R_2$) | temperature (°C.) |
| $0.9 < R_1 \leq 1$ | $0 \leq R_2 < 0.1$ | $230 \leq T \leq 280$ |
| $0.6 < R_1 \leq 0.9$ | $0.1 \leq R_2 < 0.4$ | $220 \leq T \leq 260$ |
| $0.3 < R_1 \leq 0.6$ | $0.4 \leq R_2 < 0.7$ | $210 \leq T \leq 250$ |
| $0 \leq R_1 \leq 0.3$ | $0.7 \leq R_2 \leq 1$ | $200 \leq T \leq 250$ |

The heat-treatment temperature lower than the above range leads to only small improvement in heat resistance. On the other hand, a heat-treatment temperature exceeding the above range causes reduction of mechanical strength, deformation and change in appearance and dimension on the molded item, film and filament.

Heat treatment is usually carried out for 10 minutes to 24 hours, preferably for 10 minutes to 12 hours when the heat treatment temperature exceeds 250° C. A heat-treatment time shorter than the above range leads to only small improvement on heat resistance. On the other hand, a heat-treatment time longer than the above range causes reduction of mechanical strength, deformation and change in appearance and dimension on the molded item, film and filament.

No particular restriction is imposed upon the atmosphere of heat treatment. Preferred atmosphere is the stream of nitrogen or other inert gas. The treatment can be satisfactorily carried out in the air.

No particular limitation is put upon the molecular weight of the polymer or copolymer which are used for the molded item, film, filament and sliding material of the invention. However, the polymer or copolymer having a low molecular weight have some improvement on heat resistance by the heat treatment, whereas head to great impairment of mechanical strength and thus cannot be applied to practical uses. On the other hand, high molecular weight of the polymer or copolymer is desired in view of mechanical property improvement. However, high molecular weight leads to poor processing ability and is limited of itself. Consequently, the polymer or copolymer have an inherent viscosity, a reference of molecular weight, of usually 0.4~3.0 dl/g, more preferably 0.45~2.5 dl/g, most preferably 0.5~2.0 dl/g. The glass transition temperature of the polymer or copolymer is usually 165°~235° C., although the temperature cannot sometimes be observed depending upon the preparation process and measuring method.

The invention will hereinafter be illustrated in detail by way of synthetic examples, examples and comparative examples. Properties in these examples were measured by the following methods.

(1) Liquid crystal temperature region

A sample was inserted between cover glasses and set on a Hot Stage: TH-600 RMS (a cooling and heating device for a microscope, manufactured by Japan Hitec Co.) and observed with the naked eye under a polarized microscope: model BHSP (manufactured by Olympus Optical Industry Co.). The temperature region which showed optical anisotropy was defined as a liquid crystal temperature region.

(2) Inherent viscosity

After heat-dissolving 0.50 g of a sample in 100 ml of a solvent mixture of p-chlorophenol/phenol in a weight ratio of 90/10, measured at 35° C.

(3) Glass transition temperature (Tg)

Measured with DSC (Shimadzu DT-40 Series, DSC-41M)

(4) Flow initiation temperature

Measured with a Koka type flow tester CFT-500 (manufactured by Shimadzu Seisakusho Co.) using an an orifice of 0.1 cm in diameter and 1 cm in length under pressure of 100 kg/cm².

(5) Tensile strength

Measured in accordance with ASTM D-638

(6) Tensile elongation

Measured in accordance with ASTM D-638

(7) Tensile modulus

Measured in accordance with ASTM D-638

(8) Flexural strength

Measured in accordance with ASTM D-790

(9) Flexural modulus

Measured in accordance with ASTM D-790

(10) Heat distortion temperature

Measured in accordance with ASTM D-648

(11) Abrasion coefficient

Measured with a thrust type friction abrasion tester under a sliding load of 20 kg/cm², at a sliding velocity of 20 m/min, against SUS 304 without lubrication, after driving for 6 hours.

(12) Friction coefficient

Measured with a thrust type friction abrasion tester under a sliding load of 20 kg/cm², at a sliding velocity of 20 m/min, against SUS 304, without lubrication, after driving for 6 hours.

EXAMPLE 1

To a reaction vessel equipped with a stirrer, reflux condenser and nitrogen inlet tube, 105.74 g (0.20 mole) of 1,3-bis[4-(4-aminophenoxy)-α,α-dimethylbenzyl]benzene, 21.594 g (0.099 mole) of pyromellitic dianhydride and 777.28 g N-methylpyrrolidone were charged and reacted with stirring at room temperature for 2 hours in a nitrogen atmosphere.

Successively 13.80 g (0.1188 mole) of propylene oxide and 20.099 g (0.099 mole) of terephthaloyl chloride were added and reacted with stirring at room temperature for 12 hours in a nitrogen atmosphere.

A portion of the polyamide-amic solution thus obtained was cast on a glass plate and reacted at 200° C. for 4 hours in a nitrogen atmosphere to obtained a polyamide-imide copolymer film having a thickness of 43 μm. The polyimide copolymer film had an inherent viscosity of 1.49 dl/g, Tg of 195° C. and a liquid crystal temperature region of 228°~275° C.

Comparative Example 1

To a reaction vessel equipped with a stirrer, reflux condenser and a nitrogen inlet, 105.74 g (0.20 mole) of 1,3-bis

[4-(4-aminophenoxy)-α,α-dimethylbenzyl]benzene, 591.47 g of N-methylpyrrolidone were charged and dissolved by stirring at room temperature for 10 minutes in a nitrogen atmosphere. Successively 27.88 g (0.20×1.20 mole) of propylene oxide and 41.113 g (0.20 mole) of trimellitic anhydride chloride were added and reacted with stirring at room temperature for 12 hours in a nitrogen atmosphere.

A portion of the polyamide-amic acid solution thus obtained was cast on a glass plate and reacted at 200° C. for 4 hours in a nitrogen atmosphere to obtain a polyamideimide film having a thickness of 38 μm.

The polyamide-imide film had an inherent viscosity of 1.21 dl/g and Tg of 193° C.

No thermotropic liquid crystal property was found on the polyamideimide film thus obtained.

That is, polyamide-imide having recurring structural units of the formula (12):

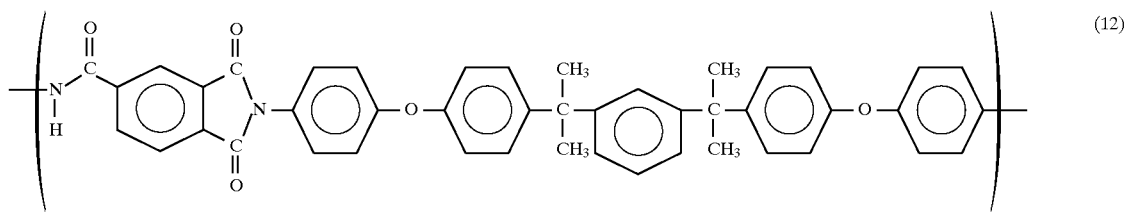

is a structural isomer of the liquid crystal polyamideimide copolymer of Example 1 having an amide imide copolymerization ratio of 50/50, and nevertheless exhibits no liquid crystal property. The fact shows that the polyamide-imide has no liquid crystal property when an imide bond and amide bond are present in the same recurring structural unit as in the formula (12), and that the polyamideimide has thermotropic liquid crystal property when the imide bond and amide bond are individually present in a different recurring structural unit as in the polyamide-imide copolymer of the invention.

EXAMPLES 2~6

The same procedures as Example 1 were carried out by using different amounts of pyromellitic dianhydride and terephthaloyl chloride to obtain five kinds of polyamide-imide films having a different copolymerization ratio.

Inherent viscosity, liquid crystal temperature region and flow initiation temperature were measured an each film and results are summarized in Table 3.

Reference Example 1

To a reaction vessel equipped with a stirrer, reflux condenser and nitrogen inlet tube, 105.74 g (0.20 mole) of 1,3-bis[4-(4-aminophenoxy)-aα,α-dimethylbenzyl]benzene, 43.188 g (0.20×0.99 mole) of pyromellitic dianhydride and 595.712 g N-methylpyrrolidone were charged and reacted with stirring at room temperature for 12 hours in a nitrogen atmosphere.

A portion of the polyamic acid solution obtained was cast on a glass plate and reacted at 250° C. for 4 hours in a nitrogen atmosphere to obtain polyimide film having a thickness of 50 μm. The polyimide film had an inherent viscosity of 1.31 dl/g and Tg of 230° C. Liquid crystal temperature region and flow initiation temperature were also measured and result are summarized in Table 3.

Reference Example 2

To a reaction vessel equipped with a stirrer, reflux condenser and nitrogen inlet tube, 105.74 g (0.20 mole) of 1.3-bis[4-(4-aminophenoxy)-α,α-dimethylbenzyl]benzene and 826.98 g of N-methylpyrrolidone were charged and dissolved by stirring for 10 minutes at room temperature in a nitrogen atmosphere. Successively 27.88 g (0.20×1.20 mole) of propylene oxide and 40.198 g (0.20×0.99 mole) of terephthaloyl chloride were added and reacted with stirring at room temperature for 12 hours in a nitrogen atmosphere.

A portion of the polyamide solution obtained was cast on a glass plate and reacted at 200° C. for 4 hours in a nitrogen atmosphere to obtain a polyamide film having a thickness of 47 μm. The polyamide film had an inherent viscosity of 1.55 dl/g and Tg of 191° C. Liquid crystal temperature region and flow initiation temperature were measured on the polyamide film and results are summarized in Table 3.

TABLE 3

| | Copolymerization ratio (imide/amide) | Pyromellitic Dianhydride g (mole) | Terephthaloyl chloride g (mole) | Inherent viscosity (dl/g) | Liquid crystal temperature region (°C.) | Flow initiation temperature (°C.) |
|---|---|---|---|---|---|---|
| Example 2 | 9/1 | 38.869 (0.1782) | 4.020 (0.0198 €|⁄) | 1.39 | 257~297 | 305 |
| Example 3 | 7/3 | 30.231 (0.1386) | 12.594 (0.0594) | 1.41 | 238~284 | 295 |
| Example 4 | 5/5 | 21.594 (0.099) | 20.099 (0.099) | 1.49 | 228~275 | 285 |
| Example 5 | 3/7 | 12.956 (0.0594) | 28.139 (0.1386) | 1.49 | 230~275 | 285 |
| Example 6 | 1/9 | 4.319 (0.0198) | 36.178 (0.1782) | 1.53 | 240~287 | 295 |
| Reference example 1 | 10/0 | 43.188 (0.198) | — | 1.31 | 277~309 | 325 |
| Reference example 2 | 0/10 | — | 40.198 (0.198) | 1.55 | 247~304 | 320 |

As seen in Table 3, the liquid crystal polyamide-imide copolymers in Example 2~6 have lower liquid crystal temperature range and flow initiation temperature as compared with polyimide of Reference Example 1 and polyamide of Reference Example 2 and in thus excellent in processing ability.

EXAMPLES 7~9

The same procedures as Example 1 were carried out except that 0.593 g (0.004 mole) of phthalic anhydride was used in addition to the raw materials of Example 1 in order to cap the end of the polymer molecule and the amounts in charge of pyromellitic dianhydride, terephthaloyl chloride and propylene oxide were changed as illustrated in Table 4, and polyamide-amic acid solutions having different copolymerization ratios were obtained. To each of the polyamide-amic acid solutions, 15.0 g of acetic anhydride and 1.0 g of γ-picoline were individually added and reacted at 75° C. for 3 hours. Each reaction product was respectively poured into 10 kg of methanol. The precipitate was filtered, washed with methanol and dried at 200° C. for 6 hours to obtain polyamide-imide copolymers in the form of powder. Table 4 illustrates yield and inherent viscosity of the copolymer powder obtained.

The copolymer powder was extruded at the temperature shown in Table 4, and pelletized to measured flow initiation temperature. Results are shown in Table 4.

Injection molding of the pellet was carried out at the temperature shown in Table 4 and specimens specified in ASTM D-638 and D-648 were prepared. Tensile properties flexural properties and heat distortion temperature were measured on these specimens and results are summarized in Table 4.

TABLE 4

| Example | 7 | 8 | 9 |
|---|---|---|---|
| Copolymerization ratio (imide/amide) | 7/3 | 5/5 | 3/7 |
| Pyromellitic dianhydride g | 30.231 | 21.594 | 12.956 |
| (mole) | (0.1386) | (0.099) | (0.0594) |
| Terephthaloyl chloride g | 12.956 | 20.099 | 28.139 |
| (mole) | (0.0594) | (0.099) | (0.1386) |
| Propylene oxide g | 8.28 | 13.80 | 19.32 |
| (mole) | (0.1426) | (0.2376) | (0.3326) |
| Yield (%) | 99.8 | 99.7 | 99.8 |
| Inherent viscosity (dl/g) | 1.41 | 1.49 | 1.49 |
| Flow initiation temperature (°C.) | 292 | 283 | 283 |
| Extrusion temperature (°C.) | 360 | 360 | 360 |
| Injection Temperature (°C.) | 370 | 360 | 360 |
| Tensile strength (kgf/mm$^2$) | 17.6 | 17.9 | 18.0 |
| Elongation (%) | 7.8 | 8.1 | 8.6 |
| Tensile modulus (kgf/mm$^2$) | 530 | 520 | 500 |
| Flexural strength (kgf/mm$^2$) | 17.0 | 17.2 | 17.5 |
| Flexural modulus (kgf/mm$^2$) | 570 | 560 | 550 |
| Heat distortion temperature (°C.) | 205 | 188 | 186 |

The polyamide-imide copolymers in Examples 7~9 had lower flow initiation temperature and improved processing ability. The molded products were also excellent in mechanical and thermal properties.

Synthetic Examples 1~5

Five kinds of polyimide were prepared by changing the amounts of 1,3-bis[4-(4-aminophenoxy)-α,α-dimethylbenzyl]benzene, pyromellitic dianhydride and phthalic anhydride as illustrated in Table 5. Each polyimide was extruded at 380°~420° C. through a twin screw extruder and pelletized. The pellet obtained was injection molded at cylinder temperature of 380°~430° C., injection pressure of 1400~2200 kg/cm$^2$ and mold temperature of 180° C. to prepare test specimens. Properties were measured by using these specimens and results are summarized in Table 5.

TABLE 5

| Synthetic Example | 1 | 2 | 3 | 4 | 5 |
|---|---|---|---|---|---|
| Charging ratio | 1 | 1 | 1 | 1 | 1 |
| Diamine (mole) *1 | | | | | |
| Pyromellitic dianhydride (mole) | 0.950 | 0.993 | 0.997 | 0.940 | 0.999 |
| Phthalic anhydride (mole) | 0.100 | 0.014 | 0.006 | 0.120 | 0.002 |
| Inherent viscosity (dl/g) | 0.450 | 1.21 | 2.72 | 0.350 | 3.27 |
| Melt viscosity (× 10$^2$ poise) | 3.50 | 301 | 8520 | 2.30 | 11300 |
| Dynamic friction coefficient | 0.34 | 0.30 | 0.29 | 0.55 | diffi-cult to pr-ocess |
| Friction coefficient (× 10$^{-8}$ cm$^3$ min/kgmHr) | 1900 | 1200 | 1100 | 4800 | |
| Tensile strength (kgf/mm$^2$) | 13.5 | 18.0 | 18.5 | 7.5 | |
| Flexural strength (kgf/mm$^2$) | 12.2 | 16.5 | 16.6 | 6.1 | |

Note) *1 Diamine: 1,3-bis [4-(4-aminophenoxy)-α,α-dimethylbenzyl] benzene

As seen in Table 5, polyimide obtained Synthetic Examples 1~3 has an inherent viscosity range of 0.4~3.0 dl/g and melt viscosity range of 250~1,000,000 poise at 360° C. under loading pressure of 300 kg/cm$^2$ and is excellent in sliding property, mechanical strength and processing ability as compared with polyimide obtained in Synthetic Examples 4 and 5.

Synthetic Examples 6~10

Five kinds of polyamide were prepared by changing the amounts of 1,3-bis[4-(4-aminophenoxy)-α,α-dimethylbenzyl]benzene, terephthaloyl chloride and benzoyl chloride as shown in Table 6. Each polyamide was extruded at 330°~370° C. through a twin screw extruder and pelletized. The pellet obtained was injection molded at cylinder temperature of 340°~380° C., injection pressure of 1400~2200 kg/cm$^2$ and mold temperature of 140° C. to prepare test specimens. Properties were measured by using these specimens and results are summarized in Table 6.

TABLE 6

| Synthetic Example | 6 | 7 | 8 | 9 | 10 |
|---|---|---|---|---|---|
| Charging ratio | 1 | 1 | 1 | 1 | 1 |
| Diamine (mole) *1 | | | | | |
| Terephthaloyl chloride (mole) | 0.940 | 0.987 | 0.995 | 0.930 | 0.998 |
| Benzoyl chloride (mole) | 0.120 | 0.026 | 0.010 | 0.140 | 0.004 |
| Inherent viscosity (dl/g) | 0.448 | 1.31 | 2.78 | 0.355 | 3.19 |
| Melt viscosity (× 10$^2$ poise) | 3.15 | 208 | 7920 | 2.18 | 10500 |
| Dynamic friction coefficient | 0.48 | 0.45 | 0.44 | 0.85 | Diffi-cult to pr-ocess |
| Friction coefficient (× 10$^{-8}$ cm$^3$ min/kgmHr) | 2500 | 1900 | 1900 | 5500 | |
| Tensile strength (kgf/mm$^2$) | 11.9 | 16.0 | 16.3 | 7.0 | |
| Flexural strength (kgf/mmm$^2$) | 11.2 | 14.5 | 14.9 | 5.9 | |

Note) *1 Diamine: 1,3-bis [4-(4-aminophenoxy)-α,α-dimethylbenzyl] benzene

As seen in Table 6, polyamide obtained in Synthetic Examples 6~8 has an inherent viscosity range of 0.4~3.0 dl/g and melt viscosity range of 250~1,000,000 poise at 360° C. under loading pressure of 300 kg/cm$^2$ and is excellent in sliding property, mechanical strength and processing ability as compared with polyamide obtained in Synthetic Examples 9 and 10.

Synthetic Examples 11~15

Five kinds of polyamide-imide copolymers were prepared by changing the amounts of 1,3-bis[4-(4-aminophenoxy)-α, α-dimethylbenzyl]benzene, pyromellitic dianhydride, terephthaloyl chloride and phthalic anhydride as shown in Table 7 and by carrying out following procedures.

To a reaction vessel equipped with a stirrer, reflux condenser and nitrogen inlet tube, 1,3-bis[4-(4-aminophenoxy)-α,α-dimethylbenzyl]benzene and pyromellitic dianhydride were charged in a mole ratio shown in Table 7. Successively N-methylpyrrolidone was charged in an amount 6 times the total amount of the above two raw materials. The mixture was reacted with stirring at room temperature for 2 hours in a nitrogen atmosphere. Thereafter 1.2 moles of propylene oxide for 1.0 mole of terephthaloyl chloride and terephthaloyl chloride in a mole ratio shown in Table 7 were charged and reacted with stirring at room temperature for 2 hours in a nitrogen atmosphere. Further, phthalic anhydride was charged in a mole ratio shown in Table 7 and reacted with stirring at room temperature for 2 hours in a nitrogen atmosphere.

To the polyamide-amic acid solution thus obtained, a catalytic amount of γ-picoline (0.25 mole ratio of γ-picoline for 1.0 mole of pyromellitic dianhydride) and 4.0 mole ratio of acetic anhydride for 1.0 mole of pyromellitic dianhydride were added and reacted at 70° C. for 3 hours. The polyamide-imide copolymer solution thus obtained was poured into 5 times the amount of methanol. The precipitate was filtered, washed with methanol and dried at 50° C. for 24 hours and 200° C. for 6 hours.

Each polyamide-imide copolymer was extruded at 330°~370° C. through a twin screw extruder and pelletized. The pellet obtained was injection molded at cylinder temperature of 340°~380° C., injection pressure of 1400~2200 kg/cm$^2$, and mold temperature of 140° C. to prepare test specimens. Properties were measured by using these specimens and results are illustrated in Table 7.

TABLE 7

| Synthetic Example | 11 | 12 | 13 | 14 | 15 |
|---|---|---|---|---|---|
| Charging ratio Diamine (mole) *1 | 1 | 1 | 1 | 1 | 1 |
| Terephthaloyl chloride (mole) | 0.477 | 0.496 | 0.4975 | 0.472 | 0.4995 |
| Pyromellitic dianhydride (mole) | 0.477 | 0.496 | 0.4975 | 0.472 | 0.4995 |
| Phthalic anhydride (mole) | 0.092 | 0.016 | 0.005 | 0.112 | 0.002 |
| Inherent viscosity (dl/g) | 0.436 | 1.28 | 2.86 | 0.360 | 3.30 |
| Melt viscosity (× 10$^2$ poise) | 3.21 | 229 | 7720 | 2.11 | 10900 |
| Dynamic friction coefficient | 0.34 | 0.30 | 0.29 | 0.55 | Difficult to process |
| Friction coefficient (× 10$^{-8}$ cm$^3$ min/kgmHr) | 1900 | 1200 | 1100 | 4800 | |

TABLE 7-continued

| Synthetic Example | 11 | 12 | 13 | 14 | 15 |
|---|---|---|---|---|---|
| Tensile strength (kgf/mm$^2$) | 13.5 | 18.0 | 18.5 | 7.5 | ocess |
| Flexural strength (kgf/mm$^2$) | 12.2 | 16.5 | 16.6 | 6.1 | |

Note) *1 Diamine: 1,3-bis [4-(4-aminophenoxy)-α,α-dimethylbenzyl] benzene

As seen in Table 7, polyamide-imide copolymers obtained in Synthetic Examples 11~13 has an inherent viscosity range of 0.4~3.0 dl/g and melt viscosity range of 250~1,000,000 poise at 360° C. under loading pressure of 300 kg/cm$^2$ and is excellent in sliding property, mechanical strength and processing ability as compared with polyamide-imide copolymers obtained in Synthetic Examples 14 and 15.

EXAMPLES 10~17

Polyimide which was prepared in Synthetic Example 2 was dry blended with other raw materials in a proportion shown in Table 8 and successively extruded at 380°~420° C. through a twin screw extruder and pelletized.

The pellet obtained was injection molded at cylinder temperature of 380°~430° C., injection pressure of 1400~2200 kg/cm$^2$, and mold temperature of 180° C. to prepare test specimens.

Properties were measured by using these specimens and results are illustrated in Table 8.

Following grades of fluoro resin, carbon fiber and graphite were used in Examples 10~17 and also in Examples 18~33 and Comparative Examples 2~10 below.

(1) Fluoro resin: PTFE, L-5 (manufactured by Daikin Co.)
(2) Carbon fiber: Carbon fibre. HTA (manufactured by Toho Rayon Co.)
(3) Graphite: Bellpearl(Trade mark), C-2000 (manufactured by Kanebo Co.)

Comparative Examples 2~4

Polyimide in Synthetic Example 2 was blended with other raw materials in a proportion shown in Table 8 by the same procedures as carried out in Examples 10~17. Procedures of Examples 10~17 were also repeated in extrusion and injection molding to obtain test specimens. Properties of polyimide were measured by these specimens and results are illustrated in Table 8.

TABLE 8

| | Example | | | | | | | | Comparative example | | |
|---|---|---|---|---|---|---|---|---|---|---|---|
| | 10 | 11 | 12 | 13 | 14 | 15 | 16 | 17 | 2 | 3 | 4 |
| Blend proportion (wt. ratio) | | | | | | | | | | | |
| Polyimide | 100 | 100 | 100 | 100 | 100 | 100 | 100 | 100 | 100 | 100 | 100 |
| Fluororesin | 0 | 20 | 0 | 0 | 20 | 20 | 0 | 20 | 160 | 0 | 0 |
| Carbon fibre | 0 | 0 | 30 | 0 | 30 | 0 | 30 | 30 | 0 | 160 | 0 |
| Graphite | 0 | 0 | 0 | 25 | 0 | 25 | 25 | 25 | 0 | 0 | 160 |
| Dynamic friction coefficient (−) | 0.30 | 0.12 | 0.21 | 0.16 | 0.11 | 0.09 | 0.15 | 0.08 | 0.11 | Difficult to process | |
| Friction coefficient (× 10$^{-8}$ cm$^3$ min/kgmHr) | 1200 | 140 | 10 | 5 | 10 | 5 | 5 | 10 | 100 | | |
| Tensile strength (kgf/mm$^2$) | 18.0 | 16.9 | 29.5 | 15.8 | 25.1 | 15.0 | 23.6 | 22.2 | 6.8 | | |
| Flexural strength (kgf/mm$^2$) | 16.5 | 14.1 | 38.1 | 14.9 | 30.7 | 14.0 | 30.8 | 29.8 | 5.5 | | |

As seen in Table 8, each Example has excellent sliding property and mechanical properties. On the other hand, Comparative Example 2 is very inferior in some of these properties. Comparative Examples 3 and 4 have very poor processing ability and are difficult to process. Thus, Comparative Examples are clearly defective.

EXAMPLES 18~25

Polyimide which was prepared in Synthetic Example 7 was dry blended with other raw materials in a proportion shown in Table 9 and successively extruded at 330°~370° C. through a twin screw extruder and pelletized.

The pellet obtained was injection molded at cylinder temperature of 340°~380° C., injection pressure of 1400~2200 kg/cm$^2$, and mold temperature of 140° C. to prepare test specimens.

Properties were measured by using these specimens and results are illustrated in Table 9.

Comparative Examples 5~7

Polyimide prepared in Synthetic Example 7 was blended with other raw materials in a proportion shown in Table 9 by the same procedures as carried out in Examples 18~25. Procedures of Examples 18~25 were also repeated in extrusion and injection molding to obtain test specimens. Properties of polyimide were measured by these specimens and results are illustrated in Table 9.

Comparative Example 5 is very inferior in some of these properties. Comparative Example 6 and 7 have very poor processing ability and are difficult to process. Thus, Comparative Examples are clearly defective.

EXAMPLES 26~33

Polyimide which was prepared in Synthetic Example 12 was dry blended with other raw materials in a proportion shown in Table 10 and successively extruded at 330°~370° C. through a twin screw extruder and pelletized.

The pellet obtained was injection molded at cylinder temperature of 340°~380° C., injection pressure of 1800~2200 kg/cm$^2$, and mold temperature of 140° C. to prepare test specimens.

Properties were measured by using these specimens and results are illustrated in Table 10.

Comparative Examples 8~10

Polyimide prepared in Synthetic Example 12 was blended with other raw materials in a proportion shown in Table 10 by the same procedures as carried out in Examples 26~33. Procedures of Examples 18~25 were also repeated in extrusion and injection molding to obtain test specimens. Properties of polyimide were measured by these specimens and results are illustrated in Table 10.

TABLE 9

| | Example | | | | | | | | Comparative example | | |
|---|---|---|---|---|---|---|---|---|---|---|---|
| | 18 | 19 | 20 | 21 | 22 | 23 | 24 | 25 | 5 | 6 | 7 |
| Blend proportion (wt. ratio) | | | | | | | | | | | |
| Polyamide | 100 | 100 | 100 | 100 | 100 | 100 | 100 | 100 | 100 | 100 | 100 |
| Fluororesin | 0 | 20 | 0 | 0 | 20 | 20 | 0 | 20 | 160 | 0 | 0 |
| Carbon fibre | 0 | 0 | 30 | 0 | 30 | 0 | 30 | 30 | 0 | 160 | 0 |
| Graphite | 0 | 0 | 0 | 25 | 0 | 25 | 25 | 25 | 0 | 0 | 160 |
| Dynamic friction coefficient (−) | 0.45 | 0.21 | 0.32 | 0.25 | 0.20 | 0.18 | 0.24 | 0.17 | 0.20 | Difficult to process | |
| Friction coefficient (× 10$^{-8}$ cm$^3$ min/kgmHr) | 1900 | 280 | 20 | 10 | 20 | 10 | 5 | 20 | 230 | | |
| Tensile strength (kgf/mm$^2$) | 16.0 | 14.9 | 26.5 | 13.7 | 22.8 | 13.0 | 21.1 | 20.1 | 5.4 | | |
| Flexural strength (kgf/mm$^2$) | 14.5 | 13.1 | 35.1 | 12.7 | 27.8 | 12.3 | 27.5 | 27.0 | 5.3 | | |

As seen in Table 9, each Example has excellent sliding property and mechanical properties. On the other hand,

TABLE 10

| | Example | | | | | | | | Comparative example | | |
|---|---|---|---|---|---|---|---|---|---|---|---|
| | 26 | 27 | 28 | 29 | 30 | 31 | 32 | 33 | 8 | 9 | 10 |
| Blend proportion (wt. ratio) | | | | | | | | | | | |
| Polyamide-imide | 100 | 100 | 100 | 100 | 100 | 100 | 100 | 100 | 100 | 100 | 100 |
| Fluororesin | 0 | 20 | 0 | 0 | 20 | 20 | 0 | 20 | 160 | 0 | 0 |
| Carbon fibre | 0 | 0 | 30 | 0 | 30 | 0 | 30 | 30 | 0 | 160 | 0 |
| Graphite | 0 | 0 | 0 | 25 | 0 | 25 | 25 | 25 | 0 | 0 | 160 |
| Dynamic friction coefficient (−) | 0.38 | 0.17 | 0.26 | 0.20 | 0.16 | 0.14 | 0.20 | 0.14 | 0.16 | Difficult to process | |
| Friction coefficient (× 10$^{-8}$ cm$^3$ min/kgmHr) | 1500 | 200 | 15 | 5 | 15 | 10 | 10 | 15 | 190 | | |

TABLE 10-continued

|  | Example | | | | | | | | Comparative example | | |
| --- | --- | --- | --- | --- | --- | --- | --- | --- | --- | --- | --- |
|  | 26 | 27 | 28 | 29 | 30 | 31 | 32 | 33 | 8 | 9 | 10 |
| Tensile strength (kgf/mm$^2$) | 17.1 | 15.9 | 28.5 | 14.5 | 24.0 | 14.1 | 22.4 | 21.0 | 6.0 | | |
| Flexural strength (kgf/mm$^2$) | 16.5 | 14.1 | 38.1 | 14.9 | 30.7 | 14.0 | 30.8 | 29.8 | 5.3 | | |

As seen in Table 10, each Example has excellent sliding property and mechanical properties. On the other hand, Comparative Example 8 is very inferior in some of these properties. Comparative Example 9 and 10 have very poor processing ability and are difficult to process. Thus, Comparative Examples are clearly defective.

As illustrated in Examples 10~33, the sliding material of the invention has essential properties of the polyamide-imide copolymer and the polyamide and polyimide type polymers, and is simultaneously excellent in processing ability, sliding characteristics, mechanical properties and chemical resistance. Thus, the sliding material can be widely used for the sliding members of mechanical parts such as gear, cam, bushing, pulley, sleeve and bearing; electric and electronic parts such as connector, bobbin and IS-socket; automotive parts such as impeller, manifold, valve guide, valve system, piston skirt, oil pan, front cover and locker cover; and other various machinery.

EXAMPLE 34

The pellet of polyimide prepared in Synthetic Example 2 was melt spun at extrusion temperature of 380°~420° C., output rate of 1.0 ml/min and spinning speed of 33 m/min to obtain a filament having a diameter of 0.20 mm. The filament was further drawn 1.8 times at 180° C. The drawn filament obtained has tensile strength of 14.5 g/d, elongation of 5.0 % and elastic modulus of 2300 g/d.

EXAMPLE 35

The pellet of polyamide prepared in Synthetic Example 7 was melt spun at extrusion temperature of 340°~360° C., output rate of 1.0 ml/min and spinning speed of 31 m/min to obtain a filament having a diameter of 0.20 mm. The filament was further drawn 1.8 times at 180° C.

The drawn filament obtained has tensile strength of 21.2 g/d, elongation of 9.5 % and elastic modulus of 2200 g/d.

EXAMPLES 36~38

The pellet of the polyamide-imide copolymer prepared in Synthetic Examples 16~18 were individually melt spun at extrusion temperature of 340°~370° C., output rate of 1.0 ml/min and spinning speed of 31 m/min to obtain a filament having a diameter of 0.20 mm. The filament was further drawn 1.6 times at 190° C. The drawn filament obtained was measured strength and results are illustrated in Table 11.

TABLE 11

| Example | 36 | 37 | 38 |
| --- | --- | --- | --- |
| Polyamide-imide copolymer (Synthetic example No.) | 16 | 17 | 18 |
| Tensile strength (g/d) | 18.0 | 20.4 | 20.9 |
| Elongation (%) | 6.8 | 8.1 | 8.9 |
| Elastic modulus (g/d) | 2300 | 2300 | 2200 |

Comparative Example 11

4,4'-Biphenylylene pyromellitic imide was wet spun in the state of polyamic acid. The polyamic acid filament obtained was thermally imidized at 200° C. to obtain a polyimide filament having a diameter of 0.20 mm. The filament had strength of 6.5 g/d, elongation of 5.0% and elastic modulus of 840 g/d.

Synthetic Examples 16~18

Three kinds of polyamide-imide copolymers were prepared by carrying out the same procedures of Synthetic Examples 11~15 except that the amounts of 1,3-bis[4-(4-aminophenoxy)-α,α-dimethylbenzyl]benzene, pyromellitic dianhydride, terephthaloyl chloride and phthalic anhydride were changed as shown in Table 12. Inherent viscosity of each polyamide-imide copolymer obtained is illustrated in Table 12.

TABLE 12

| Synthetic example | 16 | 17 | 18 |
| --- | --- | --- | --- |
| Copolymerization ratio (imide/amide) | 3/7 | 5/5 | 7/3 |
| Charging ratio (mole) Diamine (mole) *1 | 1 | 1 | 1 |
| Pyromellitic dianhydride | 0.297 | 0.495 | 0.693 |
| Terephthaloyl chloride | 0.693 | 0.495 | 0.297 |
| Phthalic anhydride | 0.02 | 0.02 | 0.02 |
| Propylene oxide | 1.663 | 1.18 | 0.713 |
| Inherent viscosity (dl/g) | 1.49 | 1.49 | 1.41 |

EXAMPLES 39~98

Comparative Examples 12~66

Following procedures were carried out:
(1) Preparation of molded items

Polyimide prepared in Synthetic Example 2, polyamide prepared in Synthetic Example 7 and the polyamide-imide copolymer prepared in Synthetic Example 16~18 were individually extruded at 380°~420° C. and pelletized. The pellet thus obtained was respectively injection molded to prepare test specimens specified in ASTM D-638 and D-648.

In Tables 14~18, these specimens are illustrated by the specimen numbers which are shown in Table 13.

TABLE 13

| Specimen No. | Synthesis Example | Kind of polymer | Copolymerization ratio (imide/amide) |
| --- | --- | --- | --- |
| 1 | 2 | polyimide | — |
| 2 | 7 | polyamide | — |
| 3 | 16 | polyamide-imide copolymer | 3/7 |
| 4 | 17 | polyamide-imide copolymer | 5/5 |
| 5 | 18 | polyamide-imide copolymer | 7/3 |

(2) Heat treatment of the molded item

The above specimens were heat treated in a nitrogen atmosphere under the conditions shown in Tables 14~18. Heat distortion temperature, tensile strength, tensile elastic modulus and elongation were measured on each heat-treated specimen.

TABLE 14

|  | Specimen | Heat treatment Temperature [°C] | Heat treatment Time (min.) | Physical properties Heat distortion temperature [°C] | Physical properties Tensile strength [kgf/mm²] | Physical properties Tensile elastic modulus [kgf/mm²] | Physical properties Elongation [%] |
|---|---|---|---|---|---|---|---|
| C.Exa | 12 | 1 | no treatment | 223 | 17.6 | 550 | 7.5 |
|  | 13 | ↑ | 170 | 15 | 224 | 17.5 | 550 | 7.4 |
|  | 14 | ↑ | ↑ | 150 | 223 | 17.6 | 560 | 7.5 |
|  | 15 | ↑ | 230 | 5 | 226 | 17.5 | 550 | 7.5 |
| Exam. | 39 | 1 | 230 | 15 | 238 | 17.5 | 550 | 7.5 |
|  | 40 | ↑ | ↑ | 60 | 242 | 17.7 | 560 | 7.2 |
|  | 41 | ↑ | ↑ | 150 | 242 | 17.5 | 560 | 7.4 |
|  | 42 | ↑ | ↑ | 600 | 243 | 17.4 | 560 | 7.0 |
| C.Exa | 16 | 1 | 230 | 1500 | 243 | 16.2 | 580 | 6.1 |
|  | 17 | ↑ | 255 | 5 | 228 | 17.5 | 550 | 7.5 |
| Exam. | 43 | 1 | 255 | 15 | 245 | 17.5 | 560 | 7.3 |
|  | 44 | ↑ | ↑ | 60 | 268 | 17.5 | 560 | 7.5 |
|  | 45 | ↑ | ↑ | 150 | 269 | 17.2 | 560 | 7.2 |
|  | 46 | ↑ | ↑ | 600 | 268 | 17.4 | 580 | 7.0 |
| C.Exa | 18 | 1 | 255 | 1500 | 269 | 16.1 | 580 | 5.5 |
|  | 19 | ↑ | 280 | 5 | 228 | 17.5 | 550 | 7.5 |
| Exam. | 47 | 1 | 280 | 15 | 245 | 17.5 | 560 | 7.4 |
|  | 48 | ↑ | ↑ | 60 | 278 | 17.2 | 570 | 7.1 |
|  | 49 | ↑ | ↑ | 150 | 279 | 17.4 | 570 | 7.1 |
|  | 50 | ↑ | ↑ | 600 | 279 | 17.0 | 570 | 7.0 |
| C.Exa | 20 | 1 | 280 | 1500 | 279 | 16.0 | 580 | 5.5 |
|  | 21 | ↑ | 310 | 15 | 228 | no measurement; deformation | | |
|  | 22 | ↑ | 310 | 150 | 228 | no measurement; deformation | | |

Note)
Exam.: Example
C.Exa: Comparative example

TABLE 15

|  | Specimen | Heat treatment Temperature [°C] | Heat treatment Time (min.) | Physical properties Heat distortion temperature [°C] | Physical properties Tensile strength [kgf/mm²] | Physical properties Tensile elastic modulus [kgf/mm²] | Physical properties Elongation [%] |
|---|---|---|---|---|---|---|---|
| C.Exa | 23 | 2 | no treatment | 185 | 18.6 | 490 | 9.5 |
|  | 24 | ↑ | 170 | 15 | 185 | 18.4 | 500 | 9.6 |
|  | 25 | ↑ | ↑ | 150 | 185 | 18.5 | 490 | 9.3 |
|  | 26 | ↑ | 200 | 5 | 190 | 18.4 | 490 | 9.2 |
| Exam. | 51 | 2 | 200 | 15 | 205 | 18.6 | 480 | 9.3 |
|  | 52 | ↑ | ↑ | 60 | 212 | 18.5 | 490 | 9.5 |
|  | 53 | ↑ | ↑ | 150 | 212 | 18.4 | 500 | 9.4 |
|  | 54 | ↑ | ↑ | 600 | 212 | 17.9 | 500 | 9.0 |
| C.Exa | 27 | 2 | 200 | 1500 | 213 | 12.8 | 510 | 5.3 |
|  | 28 | ↑ | 225 | 5 | 191 | 18.4 | 480 | 9.4 |
| Exam. | 55 | 2 | 225 | 15 | 225 | 18.5 | 490 | 9.4 |
|  | 56 | ↑ | ↑ | 60 | 235 | 18.2 | 480 | 9.5 |
|  | 57 | ↑ | ↑ | 150 | 236 | 18.0 | 480 | 9.0 |
|  | 58 | ↑ | ↑ | 600 | 236 | 16.9 | 490 | 8.5 |
| C.Exa | 29 | 2 | 225 | 1500 | 238 | 9.8 | 500 | 4.5 |
|  | 30 | ↑ | 250 | 5 | 195 | 18.4 | 490 | 9.6 |
| Exam. | 59 | 2 | 250 | 15 | 235 | 18.5 | 490 | 9.4 |
|  | 60 | ↑ | ↑ | 60 | 249 | 18.5 | 490 | 9.1 |
|  | 61 | ↑ | ↑ | 150 | 249 | 18.0 | 480 | 8.5 |
|  | 62 | ↑ | ↑ | 600 | 249 | 15.8 | 500 | 7.2 |
| C.Exa | 31 | 2 | 250 | 1500 | 250 | 16.0 | 580 | 5.5 |
|  | 32 | ↑ | 310 | 15 | no measurement; deformation | | | |
|  | 33 | ↑ | ↑ | 150 | no measurement; deformation | | | |

Note)
Exam.: Example
C.Exa: Comparative example

TABLE 16

| | Specimen | Heat treatment Temperature [°C.] | Heat treatment Time (min.) | Physical properties Heat distortion temperature [°C.] | Physical properties Tensile strength [kgf/mm²] | Physical properties Tensile elastic modulus [kgf/mm²] | Physical properties Elongation [%] |
|---|---|---|---|---|---|---|---|
| | 3 | no treatment | | 186 | 18.0 | 500 | 8.6 |
| C.Exa 34 | 3 | 170 | 15 | 185 | 17.9 | 500 | 8.6 |
| 35 | ↑ | ↑ | 150 | 186 | 18.1 | 510 | 8.7 |
| 36 | ↑ | 200 | 5 | 190 | 18.0 | 500 | 8.5 |
| Exam. 63 | 3 | 200 | 15 | 208 | 18.1 | 500 | 8.5 |
| 64 | ↑ | ↑ | 60 | 215 | 17.9 | 510 | 8.4 |
| 65 | ↑ | ↑ | 150 | 213 | 18.0 | 500 | 8.5 |
| 66 | ↑ | ↑ | 600 | 215 | 17.3 | 500 | 8.1 |
| C.Exa 37 | 3 | 200 | 1500 | 214 | 14.8 | 510 | 7.0 |
| 38 | ↑ | 225 | 5 | 194 | 18.0 | 520 | 8.5 |
| Exam. 67 | 3 | 225 | 15 | 224 | 18.0 | 490 | 8.5 |
| 68 | ↑ | ↑ | 60 | 236 | 17.9 | 510 | 8.4 |
| 69 | ↑ | ↑ | 150 | 236 | 17.5 | 510 | 8.2 |
| 70 | ↑ | ↑ | 600 | 236 | 16.9 | 500 | 8.0 |
| C.Exa 39 | 3 | 225 | 1500 | 236 | 13.7 | 500 | 7.0 |
| 40 | ↑ | 250 | 5 | 195 | 17.8 | 520 | 8.6 |
| Exam. 71 | 3 | 250 | 15 | 235 | 17.9 | 510 | 8.4 |
| 72 | ↑ | ↑ | 60 | 235 | 17.6 | 510 | 8.4 |
| 73 | ↑ | ↑ | 150 | 235 | 17.0 | 510 | 7.7 |
| 74 | ↑ | ↑ | 600 | 236 | 15.9 | 510 | 7.4 |
| C.Exa 41 | 3 | 250 | 1500 | 236 | 12.1 | 520 | 5.8 |
| 42 | ↑ | 310 | 15 | no measurement; deformation | | | |
| 43 | ↑ | ↑ | 150 | no measurement; deformation | | | |

Note)
Exam.: Example
C.Exa: Comparative example

TABLE 17

| | Specimen | Heat treatment Temperature [°C.] | Heat treatment Time (min.) | Physical properties Heat distortion temperature [°C.] | Physical properties Tensile strength [kgf/mm²] | Physical properties Tensile elastic modulus [kgf/mm²] | Physical properties Elongation [%] |
|---|---|---|---|---|---|---|---|
| | 4 | no treatment | | 188 | 17.9 | 520 | 8.1 |
| C. Exa 44 | 4 | 170 | 15 | 188 | 17.8 | 510 | 8.2 |
| 45 | ↑ | ↑ | 150 | 189 | 17.9 | 520 | 8.2 |
| 46 | ↑ | 210 | 5 | 198 | 18.0 | 530 | 8.0 |
| Exam. 75 | 4 | 210 | 15 | 218 | 17.9 | 520 | 8.2 |
| 76 | ↑ | ↑ | 60 | 224 | 18.0 | 520 | 8.1 |
| 77 | ↑ | ↑ | 150 | 223 | 17.8 | 520 | 8.2 |
| 78 | ↑ | ↑ | 600 | 225 | 17.2 | 520 | 8.0 |
| C. Exa 47 | 4 | 210 | 1500 | 226 | 15.2 | 530 | 7.0 |
| 48 | ↑ | 230 | 5 | 200 | 18.0 | 520 | 8.0 |
| Exam. 79 | 4 | 230 | 15 | 226 | 18.0 | 510 | 8.1 |
| 80 | ↑ | ↑ | 60 | 235 | 17.9 | 520 | 8.1 |
| 81 | ↑ | ↑ | 150 | 237 | 17.7 | 520 | 7.9 |
| 82 | ↑ | ↑ | 600 | 237 | 17.1 | 530 | 7.8 |
| C. Exa 49 | 4 | 230 | 1500 | 237 | 14.2 | 540 | 7.2 |
| 50 | ↑ | 250 | 5 | 195 | 18.0 | 520 | 8.1 |
| Exam. 83 | 4 | 250 | 15 | 235 | 17.8 | 530 | 8.2 |
| 84 | ↑ | ↑ | 60 | 237 | 17.4 | 540 | 8.1 |
| 85 | ↑ | ↑ | 150 | 237 | 17.0 | 540 | 7.9 |
| 86 | ↑ | ↑ | 600 | 237 | 16.5 | 540 | 7.7 |
| C. Exa 51 | 4 | 250 | 1500 | 237 | 13.5 | 550 | 6.5 |
| 52 | ↑ | 310 | 15 | no measurement; deformation | | | |
| 53 | ↑ | ↑ | 150 | no measurement; deformation | | | |

Note)
Exam.: Example
C. Exa: Comparative example

TABLE 18

| | Specimen | Heat treatment Temperature [°C.] | Heat treatment Time (min.) | Heat distortion temperature [°C.] | Tensile strength [kgf/mm²] | Tensile elastic modulus [kgf/mm²] | Elongation [%] |
|---|---|---|---|---|---|---|---|
| | 5 | no treatment | | 205 | 17.6 | 530 | 7.8 |
| C. Exa | 54 | 5 170 | 15 | 205 | 17.7 | 530 | 7.9 |
| | 55 | ↑ ↑ | 150 | 206 | 17.7 | 530 | 7.8 |
| | 56 | ↑ 220 | 5 | 211 | 17.7 | 540 | 7.8 |
| Exam. | 87 | 5 220 | 15 | 229 | 17.6 | 530 | 7.8 |
| | 88 | ↑ ↑ | 60 | 233 | 17.7 | 530 | 7.7 |
| | 89 | ↑ ↑ | 150 | 234 | 17.8 | 530 | 7.8 |
| | 90 | ↑ ↑ | 600 | 234 | 17.7 | 540 | 7.6 |
| C. Exa | 57 | 5 220 | 1500 | 234 | 16.5 | 540 | 7.0 |
| | 58 | ↑ 240 | 5 | 210 | 17.7 | 530 | 7.8 |
| Exam. | 91 | 5 240 | 15 | 241 | 17.6 | 530 | 7.8 |
| | 92 | ↑ ↑ | 60 | 251 | 17.7 | 530 | 7.8 |
| | 93 | ↑ ↑ | 150 | 252 | 17.7 | 540 | 7.7 |
| | 94 | ↑ ↑ | 600 | 255 | 17.4 | 540 | 7.5 |
| C. Exa | 59 | 5 240 | 1500 | 255 | 16.4 | 550 | 7.1 |
| | 60 | ↑ 260 | 5 | 215 | 17.6 | 530 | 7.8 |
| Exam. | 95 | 5 260 | 15 | 250 | 17.7 | 540 | 7.8 |
| | 96 | ↑ ↑ | 60 | 260 | 17.4 | 540 | 7.7 |
| | 97 | ↑ ↑ | 150 | 259 | 17.1 | 540 | 7.7 |
| | 98 | ↑ ↑ | 600 | 260 | 16.9 | 540 | 7.5 |
| C. Exa | 61 | 5 260 | 1500 | 260 | 14.9 | 570 | 6.7 |
| | 62 | ↑ 310 | 15 | no measurement; deformation | | | |
| | 63 | ↑ ↑ | 150 | no measurement; deformation | | | |

Note)
Exam.: Example
C. Exa: Comparative example

As seen in these results, the molded item obtained by heat treatment is excellent in both heat resistance and mechanical strength.

Low heat-treatment temperature and short heat-treatment time at the same time lead to almost no improvement on heat resistance. On the other hand, when the heat-treatment temperature is too high or the heat-treatment time is too long, the molded item becomes unsuitable for practical use because of deformation or reduction of mechanical strength.

Comparative Examples 64~70

Polyamide-imide which has recurring structural units of the formula (12) in Comparative Example 1 is a structural isomer of the copolymer having the recurring structural units of the formula (1) in 0.5 mole ratio and the recurring structural units of the formula (2) in 0.5 mole ratio.

Polyamideimide which was prepared according to Comparative Example 1 and had an inherent viscosity of 1.0 dl/g was extruded at 340°~370° C. and pelletized. The pellet obtained was injection molded at 340°~360° C. to prepare test specimens specified in ASTM D-638 and D-648.

The above specimens were heat-treated in a nitrogen atmosphere under conditions shown in Table 19. Heat distortion temperature, tensile strength, tensile elastic modulus and elongation were measured on each heat-treated specimen.

Results are illustrated in Table 19.

TABLE 19

| | Heat treatment Temperature [°C.] | Heat treatment Time (min.) | Heat distortion temperature [°C.] | Tensile strength [kgf/mm²] | Tensile elastic modulus [kgf/mm²] | Elongation [%] |
|---|---|---|---|---|---|---|
| C. Exa | | | | | | |
| 64 | no treatment | | 178 | 12.6 | 380 | 8.3 |
| 65 | 170 | 15 | 178 | 12.6 | 380 | 8.3 |
| 66 | ↑ | 600 | 179 | 12.6 | 390 | 8.0 |
| 67 | 190 | 15 | 178 | 12.5 | 380 | 8.2 |
| 68 | ↑ | 600 | 178 | 12.2 | 380 | 8.2 |
| 69 | 210 | 15 | no measurement; deformation | | | |
| 70 | ↑ | 600 | no measurement; deformation | | | |

Note) C.Exa: Comparative example

Comparative Examples 71~77

Polyimide having recurring structural units of the formula (13):

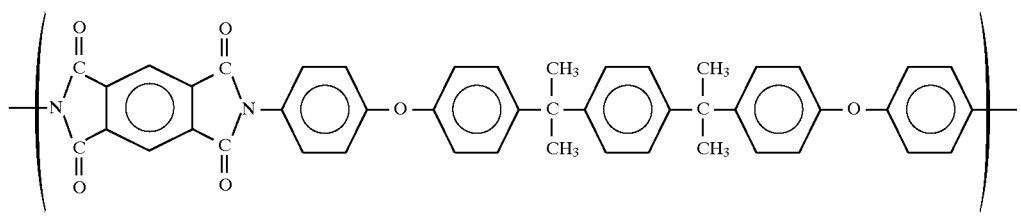

is a structural isomer of polyimide having recurring structural units of the formula (1) alone. Polyimide having the recurring structural units of the formula (13) was prepared and found to have an inherent viscosity of 0.82 dl/g.

Thus obtained polyimide was extruded at 390°~420° C. to prepare test specimens specified in ASTM D-638 and D-648.

These specimens were heat-treated in a nitrogen atmosphere under the conditions shown in Table 20. Heat distortion temperature, tensile strength, tensile elastic modulus and elongation were measured on each heat-treated specimen. Results are illustrated in Table 20.

TABLE 20

| | Heat treatment | | Physical properties | | | |
|---|---|---|---|---|---|---|
| | Temperature [°C.] | Time (min.) | Heat distortion temperature [°C.] | Tensile strength [kgf/mm²] | Tensile elastic modulus [kgf/mm²] | Elongation [%] |
| C. Exa | | | | | | |
| 71 | no treatment | | 218 | 11.6 | 460 | 5.8 |
| 72 | 220 | 15 | 218 | 11.5 | 450 | 5.9 |
| 73 | ↑ | 600 | 218 | 11.6 | 460 | 5.8 |
| 74 | 240 | 15 | 218 | 11.6 | 450 | 5.8 |
| 75 | ↑ | 600 | 219 | 11.6 | 450 | 5.8 |
| 76 | 260 | 15 | no measurement; deformation | | | |
| 77 | ↑ | 600 | no measurement; deformation | | | |

Note) C.Exa: Comparative example

Comparative examples 81~87

Polyimide having recurring structural units of the formula (14):

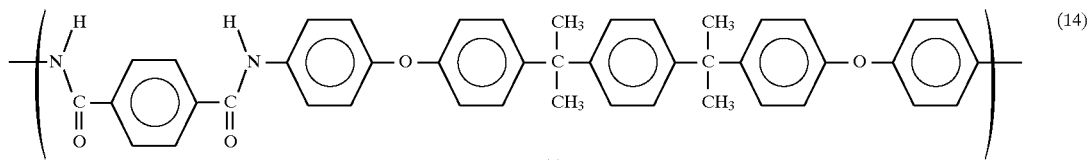

is a structural isomer of polyamide having recurring structural units of the formula (2) alone. Polyimide having the recurring structural units of the formula (14) was prepared and found to have an inherent viscosity of 0.86 dl/g.

Thus obtained polyamide was extruded at 330°~350° C. and pelletized. The pellet was injection molded at 330°~350° C. to prepared test specimens specified in ASTM D-638 and D-648.

These specimens were heat-treated in a nitrogen atmosphere under the conditions shown in Table 21. Heat distortion temperature, tensile strength, tensile elastic modulus and elongation were measured on each heat-treated specimen. Results are illustrated in Table 21.

TABLE 21

| | Heat treatment | | Physical properties | | | |
|---|---|---|---|---|---|---|
| | Temperature [°C.] | Time (min.) | Heat distortion temperature [°C.] | Tensile strength [kgf/mm²] | Tensile elastic modulus [kgf/mm²] | Elongation [%] |
| C. Exa | | | | | | |
| 78 | no treatment | | 185 | 10.1 | 300 | 5.9 |
| 79 | 190 | 15 | 184 | 10.2 | 310 | 6.0 |
| 80 | ↑ | 600 | 185 | 10.3 | 300 | 6.0 |
| 81 | 210 | 15 | 184 | 10.2 | 300 | 5.8 |
| 82 | ↑ | 600 | 185 | 10.2 | 300 | 5.9 |
| 83 | 230 | 15 | no measurement; deformation | | | |
| 84 | ↑ | 600 | no measurement; deformation | | | |

Note)
C. Exa: Comparative example

Note) C.Exa: Comparative example

When the above results of Comparative Examples 64~84 are compared with those of Examples 39~98, it is clearly understood that the effect obtained by heat-treating the molded item, film or filament is a specific effect on polyimide, polyamide or polyamide-imide of the invention.

EXAMPLE 99

Heat treatment is a common means used for crystal polymers. However, no crystallization is found on the resin which is the primary ingredient of the high heat-resistant molded item, film or filament of the invention.

In this example, a specimen was heat-treated at 250° C. for 600 minutes, that is, conditions similar to the heat-treatment conditions in Examples 50, 62, 74 and 86 which exhibited the highest heat resistance in each composition. XRD was measured on the heat-treated specimen thus obtained. However, a crystal indicating peak was not found at all and an amorphous indicating broad peak of halo was observed alone.

Comparative Examples 85~91

Polyimide having recurring structural units of the formula (15):

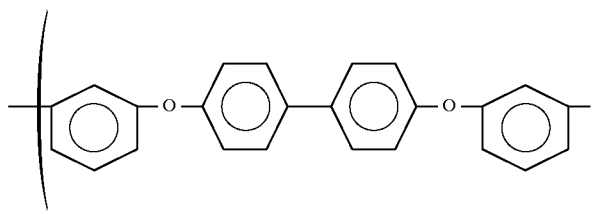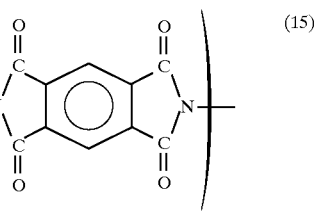

(15)

was prepared and found to have an inherent viscosity of 0.50 dl/g.

Polyimide obtained was extruded at 390°~410° C. and pelletized. The pellet obtained was injection molded at 390°~410° C. to prepare test specimens specified in ASTM D-638 and D-648.

These specimens were heat-treated in a nitrogen atmosphere under conditions shown in Table 22. Heat distortion temperature, tensile strength, tensile elastic modulus and elongation were measured on each heat-treated specimen. Results are illustrated in Table 22.

TABLE 22

| | Heat treatment | | Physical properties | | | |
|---|---|---|---|---|---|---|
| | Temperature [°C.] | Time (min.) | Heat distortion temperature [°C.] | Tensile strength [kgf/mm²] | Tensile elastic modulus [kgf/mm²] | Elongation [%] |
| C. Exa | | | | | | |
| 85 | no treatment | | 242 | 9.5 | 310 | 9.0 |
| 86 | 190 | 15 | 268 | 9.5 | 310 | 9.5 |
| 87 | ↑ | 600 | 275 | 9.2 | 320 | 7.8 |
| 88 | 280 | 60 | 275 | 9.0 | 340 | 6.5 |
| 89 | ↑ | 600 | 275 | 8.9 | 350 | 5.5 |
| 90 | 310 | 60 | no measurement; deformation | | | |
| 91 | ↑ | 600 | no measurement; deformation | | | |

Note)
C. Exa: Comparative example

Note) C.Exa: Comparative example

Comparative Example 92

A specimen was heat-treated under the conditions similar to those of Comparative Examples 86, 87, 88 and 90 in order to improve heat resistance. XRD was measured on the heat-treated specimen thus obtained. A crystal-indicating sharp peak was observed.

Comparative Example 93

XRD was measured on a non-heat-treated specimen which corresponds to that of Comparative Example 85. A crystal-indicating peak was not found at all and an amorphous-indicating broad peak of halo was observed alone.

Thus, it is understood by comparing Examples 39~98 with Comparative Examples 85~93 that the heat-treatment method in order to obtain the high heat-resistant molded item, film and filament substantially differs from the method which is commonly used in crystal polymers. Further, the heat resistance of the molded item, film and filament obtained by the heat treatment can be continuously regulated with good reproducibility by the heat-treatment conditions such as temperature, time and atmosphere. It is also understood that such characteristic essentially differs from the method which is generally used for usual crystal polymers.

However, crystal polymers greatly decrease elongation and other physical properties as shown in Comparative Examples 80~89. On the other hand, the polyimide, polyamide and polyamide-imide copolymer resins of the invention exhibit almost no reduction in mechanical properties.

Crystal polymers lead to a great change of volume (shrinkage) and deformation. However, the resins used for the molded item, film and filament of the invention result in almost no change of volume or deformation.

EXAMPLES 100~104

Comparative Example 94

Polyimide was prepared by using 1,3-bis[4-(4-aminophenoxy)-α,α-dimethylbenzyl]benzene as the diamine ingredient, pyromellitic dianhydride as the tetracarboxylic dianhydride ingredient and phthalic anhydride as the end-capping agent. The polymer had an inherent viscosity of 1.2 dl/g. The polymer was extruded at 380°~420° C. and pelletized. The pellet obtained was injection molded at 380°~420° C. to prepare test specimens specified in ASTM D-648.

The specimens were heat-treated in a nitrogen atmosphere under the conditions shown in Table 23. Shrinkage (volume ratio) was measured on each heat-treated specimen and illustrated in Table 23 together with temperature.

The shrinkage (volume ratio) is indicated by volume percentage when the volume before heat-treatment is regarded as 100%.

TABLE 23

| | | Heat treatment | | Physical properties | |
|---|---|---|---|---|---|
| | | Temperature [°C.] | Time (min.) | Heat distortion temperature [°C.] | Shrinkage (Volume ratio) (%) |
| C. Exa | 94 | no treatment | | 223 | 100 |
| Exam. | 100 | 230 | 150 | 242 | 99.8 |
| | 101 | 250 | 150 | 269 | 99.3 |
| | 102 | 270 | 60 | 278 | 99.1 |
| | 103 | ↑ | 150 | 297 | 99.0 |
| | 104 | ↑ | 600 | 279 | 99.0 |

Note)
C. Exa: Comparative example
Exam.: Example

Note) C.Exa: Comparative example Exam.: Example

Comparative Examples 99~100

Crystal polyimide having recurring structural units of the above formula (15) was prepared and found to have an inherent viscosity of 0.50 dl/g.

Polyimide obtained was extruded at 390°~410° C. and pelletized. The pellet obtained was injection molded at 390°~410° C. to prepare the in ASTM D-648.

The above specimen was heat treated and measured shrinkage.

Results are illustrated in Table 24 together with heat distortion temperature.

TABLE 24

| | | Heat treatment | | Heat distortion temperature [°C.] | Shrinkage (Volume ratio) (%) |
|---|---|---|---|---|---|
| | | Temperature [°C.] | Time (min.) | | |
| C. Exa | 105 | no treatment | | 242 | 100 |
| | 106 | 250 | 600 | 268 | 91.5 |
| | 107 | ↑ | 600 | 275 | 85.9 |
| | 108 | 280 | 60 | 275 | 85.6 |
| | 109 | ↑ | 600 | 275 | 85.6 |

Note) C.Exam: Comparative example Exam.: Example

As clearly understood by comparison of Comparative Example 94, Examples 100~104 and Comparative Examples 95~99, the resin used for the molded item, film and filament of the invention differs from the crystal polymer and has almost no volume change or deformation. The fact illustrates that the molded item, film and filament of the invention are very excellent in dimensional stability and thus have extremely large fields of application.

The invention provides the molded item, film and filament primarily comprising the polyamide-imide copolymer, polyamide and polyimide which are excellent in processing ability and mechanical properties and simultaneously have very superior heat resistance.

The polyamide-imide copolymer, polyamide and polyimide have good moisture absorption, sliding property, electrical property, solvent resistance and chemical resistance at the same time, are excellent in dimensional stability at the processing step and suited for melt processing.

The molded item, film and filament primarily comprising these polymers have very good heat resistance, moisture absorption, sliding property, electrical property, solvent resistance and chemical resistance at the same time.

What is claimed is:

1. A liquid crystal polyamide-imide copolymer comprising in a polymer molecule 0.05~0.95 mole ratio of the recurring structural units of the formula (1):

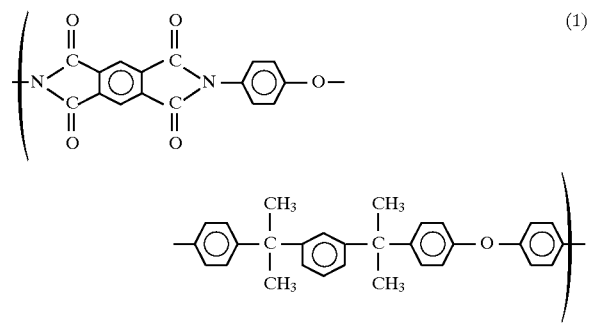

and 0.95~0.05 mole ratio of recurring structural units of the formula (2):

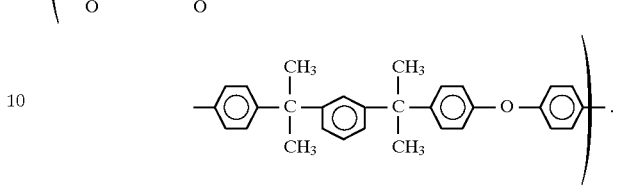

2. A liquid crystal polyamide-imide copolymer of claim 1 wherein the liquid crystal polyamide-imide copolymer is capped at the molecular chain end with aromatic dicarboxylic anhydride represented by the general formula (3), an aromatic monocarboxylic acid derivative represented by the general formula (4) and/or aromatic monoamine represented by general formula (5)

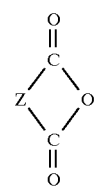

wherein Z is a divalent radical having 6~15 carbon atoms and selected from the group consisting of a monoaromatic radical, condensed polyaromatic radical and noncondensed aromatic radical connected each other with a direct bond or a bridge member

wherein Y is a monovalent radical having 6~15 carbon atoms and selected from the group consisting of a monoaromatic radical, condensed polyaromatic radical and noncondensed aromatic radical connected to each other with a direct bond or a bridge member, and X is a halogen atom

wherein V is a monovalent radical having 6~15 carbon atoms and selected from the group consisting of a monoaromatic radical, condensed polyaromatic radical and noncondensed aromatic radical connected to each other with a direct bond or a bridge member.

3. A preparation process of the liquid crystal polyamide-imide copolymer of claim 2 comprising reacting 1,3-bis[4-(4-aminophenoxy)-α,α-dimethylbenzyl]benzene of the formula (6):

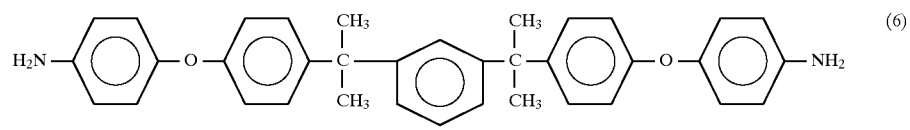

with pyromellitic dianhydride of the formula (7):

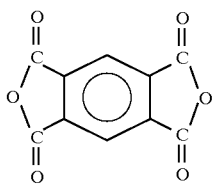 (7)

and a terephthalic acid derivative of the general formula (8):

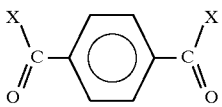 (8)

wherein X is a halogen atom, in the presence or absence of aromatic dicarboxylic anhydride represented by the general formula (3), an aromatic monocarboxylic acid derivative represented by the general formula (4) and/or aromatic monoamine represented by the general formula (5) and thermally or chemically imidizing polyamide-amic acid obtained

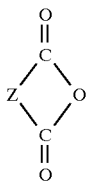 (3)

wherein Z is a divalent radical having 6~15 carbon atoms and selected from the group consisting of a monoaromatic radical, condensed polyaromatic radical and noncondensed aromatic radical connected each other with a direct bond or a bridge member

 (4)

wherein Y is a monovalent radical having 6~15 carbon atoms and selected from the group consisting of a monoaromatic radical, condensed polyaromatic radical and noncondensed aromatic radical connected to each other with a direct bond or a bridge member, and X is a halogen atom

 (5)

wherein V is a monovalent radical having 6~15 carbon atoms and selected from the group consisting of a monoaromatic radical, condensed polyaromatic radical and noncondensed aromatic radical connected each other with a direct bond or a bridge member.

4. A preparation process of the liquid crystal polyamide-imide copolymer of claim 3 wherein the amount of aromatic dicarboxylic acid anhydride represented by the above general formula (3) is 0.001~1.0 mole for 1 mole of 1,3-bis[4-(4-aminophenoxy)-α,α-dimethylbenzyl]benzene of the formula (6).

5. A preparation process of the liquid crystal polyamide-imide copolymer of claim 3 wherein the amount of the aromatic monocarboxylic acid derivative represented by the above general formula (4) is 0.001~1.0 mole for 1 mole of 1,3-bis[4-(4-aminophenoxy)-α,α-dimethylbenzyl]benzene of the above formula (6).

6. A preparation process of the liquid crystal polyamide-imide copolymer of claim 3 wherein the amount of the aromatic monoamine represented by the above general formula (5) is 0.001~1.0 for 1 total mole of pyromellitic dianhydride of the above formula (7) and the terephthalic acid derivative represented by the above general formula (8).

7. A heat-resistant filament consisting essentially of a liquid crystal polyamide-imide copolymer having recurring structural units of the formula (1) and recurring structural units of the formula (2)

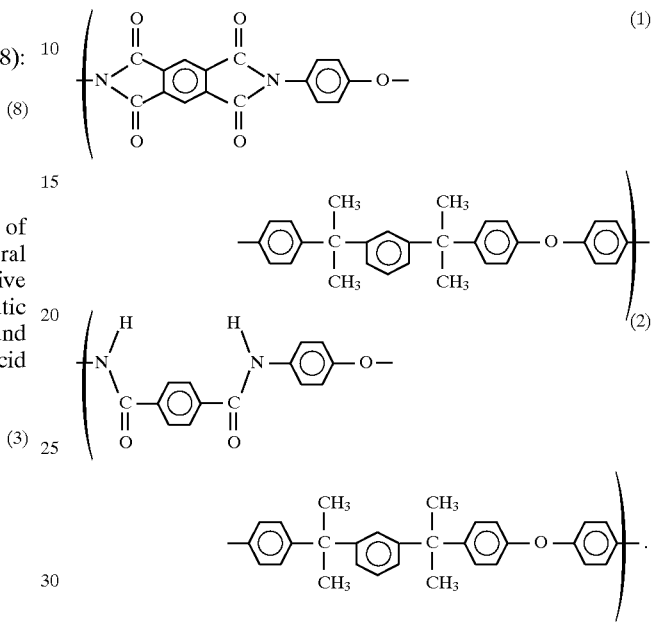

8. A heat-resistant filament of claim 7 wherein the liquid crystal polyamide-imide copolymer having recurring structural units of the formula (1) and recurring structural units of the formula (2) is capped at the end of polymer molecule with aromatic dicarboxylic acid anhydride represented by the general formula (3), the aromatic monocarboxylic acid derivative represented by the general formula (4) and/or aromatic monoamine represented by the general formula (5)

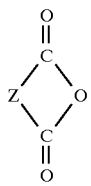 (3)

wherein Z is a divalent radical having 6–15 carbon atoms and selected from the group consisting of a monoaromatic radical, condensed polyaromatic radical and noncondensed aromatic radical connected to each other with a direct bond or a bridge member

 (4)

wherein Y is a monovalent radical having 6–15 carbon atoms and selected from the group consisting of a monoaromatic radical, condensed polyaromatic radical and noncondensed aromatic radical connected to each other with a direct bond or a bridge member, and X is a halogen atom

 (5)

wherein V is a monovalent radical having 6~15 carbon atoms and selected from the group consisting of a monoaromatic radical, condensed polyaromatic radical and noncondensed aromatic radical connected to each other with a direct bond or a bridge member.

9. A heat-resistant filament of claim 8 wherein 100 parts by weight of the copolymer is mixed with less than 50 parts by weight of metal powder.

10. A sliding material consisting essentially of a resin wherein the liquid crystal polyamide-imide copolymer having recurring structural units of the formula (1) and recurring structural units of the formula (2) has an inherent viscosity of 0.4~3.0 dl/g and a melt viscosity of 250~1,000,000 poise at 360° C. under loading pressure of 300 kg/cm²

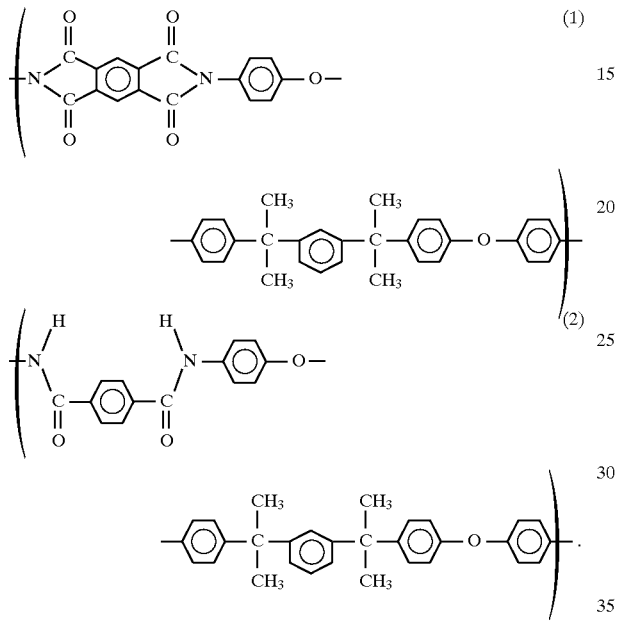

11. A sliding material of claim 10 wherein the liquid crystal polyamide-imide copolymer having recurring structural units of the formula (1) and recurring structural units of the formula (2) is capped at the end of polymer molecule with aromatic dicarboxylic anhydride represented by the general formula (3), the aromatic monocarboxylic acid derivative represented by the general formula (4) and/or aromatic monoamine represented by the general formula (5)

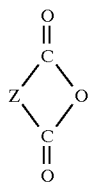 (3)

wherein Z is a divalent radical having 6~15 carbon atoms and selected from the group consisting of a monoaromatic radical, condensed polyaromatic radical and noncondensed aromatic radical connected each with a direct bond or a bridge member

 (4)

wherein Y is a monovalent radical having 6~15 carbon atoms and selected from the group consisting of a monoaromatic radical, condensed polyaromatic radical and noncondensed aromatic radical connected each other with a direct bond or a bridge member, and X is a halogen atom

 (5)

wherein V is a monovalent radical having 6~15 carbon atoms and selected from the group consisting of a monoaromatic radical, condensed polyaromatic radical and noncondensed aromatic radical connected each other with a direct bond or a bridge member.

12. A sliding material of claim 11 wherein 100 parts by weight of the polymer or copolymer comprises a sum of 1~150 parts by weight of at least one additive selected from the group consisting of fluoro resin, graphite and carbon fiber.

13. A sliding material of claim 11 wherein the polymer or copolymer comprises at least one fluoro resin selected from the group consisting of (a)~(f):

(a) a tetrafluoroethylene resin having recurring structural units of the formula; —(CF$_2$CF$_2$)— in the molecule;

(b) a tetrafluoroethylene-hexafluoropropylene copolymer resin having recurring structural units of the formula; —(CF$_2$CF$_2$)— and the formula; —(CF(CF$_3$)CF$_2$)— in the molecule;

(c) a tetrafluoroethylene-perfluoroalkyl vinylether copolymer resin having recurring structural units of the formula; —(CF$_2$CF$_2$)— and the formula; —(CF(OC$_m$F$_{2m+1}$)CF$_2$)—, where m is an integer of 1~10, in the molecule;

(d) a tetrafluoroethylene-ethylene copolymer resin having recurring structural units of the formula; —(CF$_2$CF$_2$)— and the formula; —(CH$_2$CH$_2$)— in the molecule;

(e) a trifluoromonochloroethylene-ethylene copolymer resin having recurring structural units of the formula; —(CFClCF$_2$)— and the formula; —(CH$_2$CH$_2$)— in the molecule; and (f) a fluorovinylidene resin having recurring structural units of the formula; —(CF$_2$CH$_2$)— in the molecule.

14. A molded article prepared from a resin consisting essentially of a liquid crystal polyamide-imide copolymer having recurring structural units of the formula (1) and formula (2), and successively by heat-treating said molded item at temperature of 180°~300° C. for 10 minutes to 24 hours

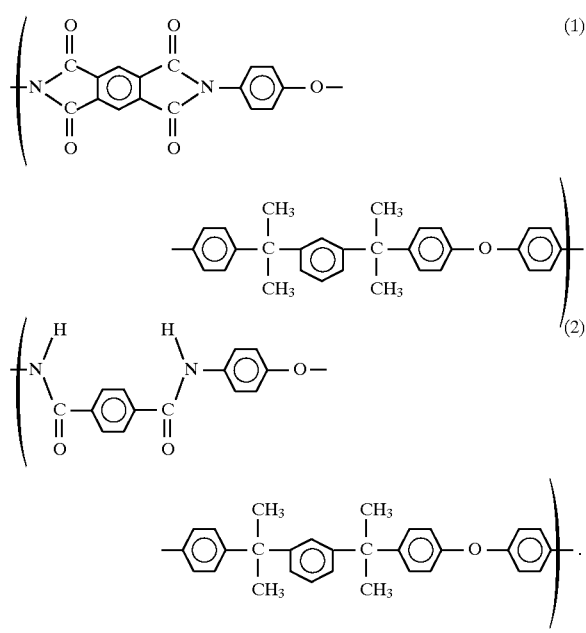

15. A molded article of claim 14 wherein the molded article is a film.

16. A molded article of claim 14 wherein the molded article is a filament.

17. The sliding material of claim 11 where the material is heat treated at a temperature of 180°~30° C. for 10 minutes to 24 hours.

18. A preparation process of the liquid crystal polyamide-imide copolymer of claim 1 comprising reacting 1,3-bis[4-(4-aminophenoxy)-α,α-dimethylbenzyl]benzene of the formula (6):

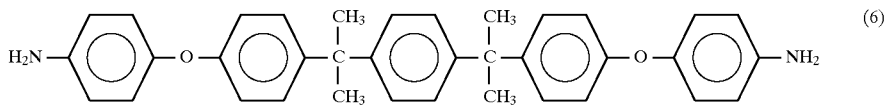

with pyromellitic dianhydride of the formula (7):

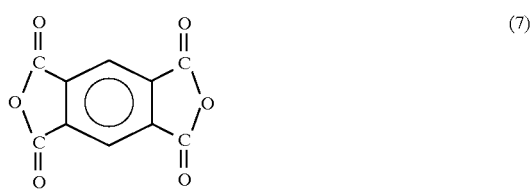

and a terephthalic acid derivative of the general formula (8):

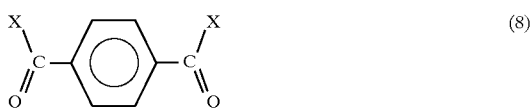

wherein X is a halogen atom, in the presence or absence of aromatic dicarboxylic anhydride represented by the general formula (3), an aromatic monocarboxylic acid derivative represented by the general formula (4) and/or aromatic monoamine represented by the general formula (5) and thermally or chemically imidizing polyamide-amic acid obtained

wherein Z is a divalent radical having 6~15 carbon atoms and selected from the group consisting of a monoaromatic radical, condensed polyaromatic radical and noncondensed aromatic radical connected to each other with a direct bond or a bridge member

wherein Y is a monovalent radical having 6~15 carbon atoms and selected from the group consisting of a monoaromatic radical, condensed polyaromatic radical and noncondensed aromatic radical connected to each other with a direct bond or a bridge member, and X is a halogen atom

wherein V is a monovalent radical having 6~15 carbon atoms and selected from the group consisting of a monoaromatic radical, condensed polyaromatic radical and noncondensed aromatic radical connected to each other with a direct bond or a bridge member.

19. A preparation process of the liquid crystal polyamide-imide copolymer of claim 18 wherein the amount of aromatic dicarboxylic acid anhydride represented by the above general formula (3) is 0.001~1.0 mole for 1 mole of 1,3-bis[4-(4-aminophenoxy)-α,α-dimethylbenzyl]benzene of the formula (6).

20. A preparation process of the liquid crystal polyamide-imide copolymer of claim 18 wherein the amount of the aromatic monocarboxylic acid derivative represented by the above general formula (4) is 0.001~1.0 mole for 1 mole of 1,3-bis[4-(4-aminophenoxy-α,α-dimethylbenzyl]benzene of the above formula (6).

21. A preparation process of the liquid crystal polyamide-imide copolymer of claim 18 wherein the amount of the aromatic monoamine represented by the above general formula (5) is 0.001~1.0 for 1 total mole of pyromellitic dianhydride of the above formula (7) and the terephthalic acid derivative represented by the above general formula (8).

22. A heat-resistant filament of claim 7 wherein 100 parts by weight of the polymer or copolymer is mixed with less than 50 parts by weight of metal powder.

23. A sliding material of claim 10 wherein 100 parts by weight of the copolymer comprises a sum of 1~150 parts by weight of at least one additive selected from the group consisting of fluoro resin, graphite and carbon fiber.

24. A sliding material of claim 10 wherein the copolymer comprises at least one fluoro resin selected from the group consisting of (a)–(f):

(a) A tetrafluoroethylene resin having recurring structural units of the formula; —($CF_2CF_2$)— in the molecule;

(b) A tetrafluoroethylene-hexafluoropropylene copolymer resin having recurring structural units of the formula; —($CF_2CF_2$)— and the formula; —($CF(CF_3)CF_2$)— in the molecule;

(c) A tetrafluoroethylene-perfluoroalkyl vinylether copolymer resin having recurring structural units of the formula; —($CF_2CF_2$)— and the formula; —($CF(OC_mF_{2m+1})CF_2$)—, wherein m is an integer of 1~10, in the molecule;

(d) A tetrafluoroethylene-ethylene copolymer resin having recurring structural units of the formula; —($CF_2CF_2$)— and the formula; —($CH_2CH_2$)— in the molecule;

(e) A trifluoromonochloroethylene-ethylene copolymer resin having recurring structural units of the formula; —($CFClCF_2$)— and the formula; —($CH_2CH_2$)— in the molecule; and (f) A fluorovinylidene resin having recurring structural units of the formula; —($CF_2CH_2$)— in the molecule.

25. A molded article of claim 14 wherein the liquid crystal polyamide-imide copolymer having recurring structural units of the formula (1) and the formula (2) is capped at the end of polymer molecular with aromatic dicarboxylic anhydride represented by the general formula (3), an aromatic monocarboxylic acid derivative represented by the general formula (4) and/or aromatic monoamine represented by the general formula (5)

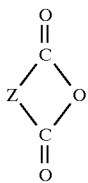
(3)

wherein Z is a divalent radical having 6~15 carbon atoms and selected from the group consisting of a monoaromatic radical, condensed polyaromatic radical and noncondensed aromatic radical connected to each other with a direct bond or a bridge member

(4)

wherein Y is a monovalent radical having 6~15 carbon atoms and selected from the group consisting of a monoaromatic radical, condensed polyaromatic radical and noncondensed aromatic radical connected to each other with a direct bond or a bridge member, and X is a halogen atom

(5)

wherein V is a monovalent radical having 6~15 carbon atoms and selected from the group consisting of a monoaromatic radical, condensed polyaromatic radical and noncondensed aromatic radical connected to each other with a direct bond or a bridge member.

26. A molded article of claim 25 wherein the molded article is a film.

27. A molded article of claim 25 wherein the molded article is a filament.

28. The sliding material of claim 10 wherein the material is heat treated at a temperature of 180°~30° C. for 10 minutes to 24 hours.

* * * * *